(12) United States Patent
Stuehler et al.

(10) Patent No.: US 11,301,643 B2
(45) Date of Patent: Apr. 12, 2022

(54) STRING EXTRACTION AND TRANSLATION SERVICE

(71) Applicant: SAP SE, Walldorf (DE)

(72) Inventors: Robert Stuehler, Speyer (DE); Michail Vasiltschenko, Schriesheim (DE); Anton Snitko, Edingen-Neckarhausen (DE); Yvonne Miklosch, Nussloch (DE); Benjamin Schork, Wilhelmsfeld (DE); Jochen Geib, Speyer (DE); Jens Scharnbacher, Walldorf (DE); Klaus Heitlinger, Oberderdingen (DE)

(73) Assignee: SAP SE, Walldorf (DE)

( * ) Notice: Subject to any disclaimer, the term of this patent is extended or adjusted under 35 U.S.C. 154(b) by 188 days.

(21) Appl. No.: 16/700,734

(22) Filed: Dec. 2, 2019

(65) Prior Publication Data
US 2021/0165855 A1 Jun. 3, 2021

(51) Int. Cl.
*G06F 40/58* (2020.01)
*G06F 16/903* (2019.01)
(Continued)

(52) U.S. Cl.
CPC ........ *G06F 40/58* (2020.01); *G06F 16/90344* (2019.01); *G06F 40/151* (2020.01); *G06F 40/20* (2020.01); *G06F 40/51* (2020.01)

(58) Field of Classification Search
CPC .. G06F 40/20; G06F 40/151; G06F 16/90344; G06F 16/9535; G06F 40/205;
(Continued)

(56) References Cited

U.S. PATENT DOCUMENTS

| 8,843,360 B1* | 9/2014 | Johnston | G06F 9/454 704/8 |
| 2005/0267733 A1* | 12/2005 | Hueber | G06F 40/58 704/2 |

(Continued)

OTHER PUBLICATIONS

Pasch et al., "Taking Applications global with SAP Translation Hub," retrieved from: http://www.ausape.com/documentos/Archivo/1-Presentaciones/Sesiones_Tematicas/2017/Localizacion/2017-11-17_5LocDay_Spain_Translation_Hub.pdf, Nov. 2017, 20 pages.

(Continued)

*Primary Examiner* — Jesse S Pullias
(74) *Attorney, Agent, or Firm* — Klarquist Sparkman, LLP

(57) ABSTRACT

Techniques and solutions are described for translating strings in a human language that are associated with code, such as code that declares user interface elements in association with which the strings can be displayed. The strings can be embedded in code, or can be included in files that are accessed by the code or used in creating executable code. Strings can be extracted from data, such as files, received in a translation request. After translation, such as by a human translator or using automatic translation, the translation results can be provided in response to the translation request. The translation process can be automated, such that changes to files in a code repository can trigger a translation request. Disclosed technologies can facilitate the production of programs that are localized using different human languages.

20 Claims, 24 Drawing Sheets

(51) Int. Cl.
*G06F 40/20* (2020.01)
*G06F 40/51* (2020.01)
*G06F 40/151* (2020.01)

(58) Field of Classification Search
CPC . G06F 9/454; G06F 40/40–58; G06F 16/3337
USPC ........................................................ 704/2–8
See application file for complete search history.

(56) References Cited

U.S. PATENT DOCUMENTS

| | | | |
|---|---|---|---|
| 2009/0282394 A1* | 11/2009 | Raj | G06F 9/454 717/136 |
| 2010/0107114 A1* | 4/2010 | Zachcial | G06F 16/9535 715/780 |
| 2017/0371631 A1* | 12/2017 | Haiderzaidi | G06F 9/454 |
| 2018/0052827 A1* | 2/2018 | Mathada | G06F 9/454 |
| 2018/0143975 A1* | 5/2018 | Casal | G06F 40/58 |
| 2019/0205398 A1* | 7/2019 | Lagunas | G06F 40/51 |

OTHER PUBLICATIONS

Colucci, Easily Build your own "Google Translate" using SAP Cloud Platform, retrieved from: https://blogs.sap.com/2017/06/08/easily-build-your-own-google-translate-using-sap-cloud-platform/, Jun. 8, 2017, 5 pages.

Meijering, "Introduction to SAP Translation—E-Book Presentation," retrieved from: http://www.sapevents.edgesuite.net/desapusergroupsknowledgetransfer/2016/pdfs/161117_e_book_for_global.pdf, 2016, or at least as early as Dec. 2019, 35 pages.

* cited by examiner

```
###########################################################################################

Application Level

###########################################################################################
#TRANSLATE
application.welcome=Willkommen %first_name%%middle_initials%%last_name%
#NOTR
application.offline=Offline
#NOTR
application.offline.alt=Offline
#NOTR
application.online=Online
#NOTR
application.online.alt=Online
#TRANSLATE
application.testuser=Testbenutzer
#TRANSLATE
general.yes=Ja
#TRANSLATE
general.no=Nein
#NOTR
general.selectone=select one
#NOTR
general.refresh=Refresh

###########################################################################################

Button/Link Labels - This section contains labels used by commonly found buttons/links within
the application(ie Save, Cancel).

###########################################################################################
#NOTR
button.save=Speichern
#TRANSLATE
button.delete=L\u00F6schen
#NOTR
button.remove=Remove
#TRANSLATE
button.cancel=Abbrechen
#NOTR
button.close=Close
#TRANSLATE
button.done=Fertig
#TRANSLATE
button.return=Zur\u00FCck
#TRANSLATE
button.add=Hinzuf\u00FCgen
#NOTR
button.submit=Submit
#NOTR
button.notify_employee=Notify Employee
#NOTR
button.submit_report=Submit Report
#NOTR
button.save_and_continue=Save & Continue
#NOTR
button.save_and_create=Save & Create Another
```

FIG. 5A

```
                  ┌─512
#NOTR
button.save_and_add=Save & Add Another
#TRANSLATE
button.ok=OK    ─516
#TRANSLATE                          520─┐
button.showall=Ergebnisse auf einer Seite anzeigen
#TRANSLATE
button.showpages=Ergebnisse auf mehreren Seiten anzeigen
#NOTR
button.perfscriptrec=Performance Script
#NOTR
button.unittestscript=Unit Test Script
#TRANSLATE                                    ┐ 508
button.prev_page_group=Vorherige Seitengruppe ┘
#TRANSLATE
button.next_page_group=N\u00E4chste Seitengruppe
#NOTR
button.print=Print
########################################################################################

Alt Text - This section contains the ALT text used by all images in the system

########################################################################################
#TRANSLATE              ┐ 508
company.logo.alt=Logo   ┘
#TRANSLATE
MyInfo.alt=Meine Info
#TRANSLATE
Help.alt=Hilfe  512
########################################################################################

Help Text -

########################################################################################
#NOTR
helptext.save_and_continue=Diese Ausgabe speichern und weiteren Ausgabeneintrag erstellen
#TRANSLATE
help_text.cancel=\u00C4nderungen abbrechen
#NOTR
help_text.save=Save changes
#TRANSLATE              ─520
help_text.done=Fertig
#TRANSLATE
help_text.ok=Dateneingabe beendet
#NOTR   ┌─516
help_text.up=Move this item up in the list
#NOTR
help_text.down=Move this item down in the list
#NOTR
help_text.continue_entry=Load the form for the selected expense type
#NOTR
help_text.continue_employee=Load the form for the selected Group
#TRANSLATE
help_text.sort_asc=Spalte in aufsteigender Reihenfolge sortieren
#TRANSLATE
help_text.sort_dsc=Spalte in absteigender Reihenfolge sortieren
#TRANSLATE
help_text.back=Speichern und zur\u00FCck
#TRANSLATE
help_text.next=Speichern und fortfahren
#TRANSLATE
help_text.help=Klicken Sie hier, um Hilfe zu erhalten.
#TRANSLATE
help_text.myinfo=Klicken Sie hier, um "Meine Info" anzuzeigen.
#NOTR
help_text.skip_tutorial=Skip the Tutorial
```

FIG. 5B

```
600
################################################################################

Application Level

################################################################################
      512
#TRANSLATE
application.welcome=Welcome %first_name% %middle_initials% %last_name%
#NOTR
application.offline=Offline
#NOTR
application.offline.alt=Offline  ⎤
                                 ⎬ 508
application.online=Online        ⎦
#NOTR
application.online.alt=Online
#TRANSLATE
application.testuser=Test User
#TRANSLATE              520
general.yes=Yes
#TRANSLATE
general.no=No
#NOTR
general.selectone=select one  ⎤ 508
#NOTR
general.refresh=Refresh
     516

################################################################################

Button/Link Labels - This section contains labels used by commonly found buttons/links within
the application(ie Save, Cancel).

################################################################################
#NOTR
button.save=Save
#TRANSLATE
button.delete=Delete
#NOTR
button.remove=Remove
#TRANSLATE
button.cancel=Cancel  ⎤ 508
#NOTR
button.close=Close
#TRANSLATE
button.done=Done  512
#TRANSLATE
button.return=Return
#TRANSLATE         520
button.add=Add
#NOTR   516
button.submit=Submit
#NOTR
button.notify_employee=Notify Employee
#NOTR
button.submit_report=Submit Report
#NOTR
button.save_and_continue=Save & Continue
#NOTR
button.save_and_create=Save & Create Another
#NOTR
button.save_and_add=Save & Add Another
#TRANSLATE
button.ok=OK
#TRANSLATE
button.showall=View Results on One Page
#TRANSLATE
button.showpages=View Results on Multiple Pages
```

512
#NOTR       516
button.perfscriptrec=Performance Script
#NOTR                                    520
button.unittestscript=Unit Test Script
#TRANSLATE
button.prev_page_group=Previous group of pages
#TRANSLATE                                      ⎤
button.next_page_group=Next group of pages ─── ⎦ 508
#NOTR
button.print=Print
####################################################################################

Alt Text - This section contains the ALT text used by all images in the system
####################################################################################
#TRANSLATE
company.logo.alt=Logo
#TRANSLATE                ⎤
MyInfo.alt=My Info ─── ⎦ 508
#TRANSLATE
Help.alt=Help

####################################################################################

Help Text -
####################################################################################
#NOTR
helptext.save_and_continue=Save this expense and create another expense entry
#TRANSLATE
help_text.cancel=Cancel changes
#NOTR                            520
help_text.save=Save changes
#TRANSLATE
help_text.done=Done 512
#TRANSLATE
help_text.ok=Done entering data
#NOTR                                              ⎤
help_text.up=Move this item up in the list ─── ⎦ 508
#NOTR       516
help_text.down=Move this item down in the list
#NOTR                                              520
help_text.continue_entry=Load the form for the selected expense type
#NOTR
help_text.continue_employee=Load the form for the selected Group
#TRANSLATE
help_text.sort_asc=Sort column in ascending order
#TRANSLATE
help_text.sort_dsc=Sort column in descending order
#TRANSLATE
help_text.back=Save and go back
#TRANSLATE
help_text.next=Save and continue
#TRANSLATE
help_text.help=Click here for help
#TRANSLATE
help_text.myinfo=Click here for My Info
#NOTR
help_text.skip_tutorial=Skip the Tutorial
```

FIG. 6B

```
###############################################################################

Application Level

###############################################################################
        ╭─512
#TRANSLATE
application.welcome=Bienvenue %first_name%%middle_initials%%last_name%
#NOTR
application.offline=Offline
#NOTR      ╰─516
application.offline.alt=Offline
#NOTR              ╰─520
application.online=Online
#NOTR
application.online.alt=Online
#TRANSLATE
application.testuser=Utilisateur test
#TRANSLATE
general.yes=Oui
#TRANSLATE
general.no=Non
#NOTR
general.selectone=select one
#NOTR
general.refresh=Refresh ⎤ 508

###############################################################################

Button/Link Labels - This section contains labels used by commonly found buttons/links within
the application(ie Save, Cancel).

###############################################################################
#NOTR
button.save=Enregistrer
#TRANSLATE
button.delete=Supprimer
#NOTR
button.remove=Remove
#TRANSLATE       ╭─520
button.cancel=Annuler
#NOTR
button.close=Close
#TRANSLATE
button.done=Terminer
#TRANSLATE
button.return=Retourner
#TRANSLATE     ⎤ 508
button.add=Ajouter
#NOTR
button.submit=Submit
#NOTR
button.notify_employee=Notify Employee
#NOTR                         ╰─520
button.submit_report=Submit Report
#NOTR
button.save_and_continue=Save & Continue
#NOTR
button.save_and_create=Save & Create Another
#NOTR
button.save_and_add=Save & Add Another
#TRANSLATE       ╰─516
button.ok=OK  512
#TRANSLATE
button.showall=Afficher les r\u00E9sultats sur une page
#TRANSLATE
button.showpages=Afficher les r\u00E9sultats sur plusieurs pages
#NOTR
button.perfscriptrec=Performance Script
```

FIG. 7A

```
                                    700
      512
#NOTR
button.unittestscript=Unit Test Script
#TRANSLATE       516
button.prev_page_group=Groupe de pages pr\u00E9c\u00E9dent
#TRANSLATE
button.next_page_group=Groupe de pages suivant
#NOTR                                           520
button.print=Print    508

###########################################################################################

Alt Text - This section contains the ALT text used by all images in the system

###########################################################################################
#TRANSLATE         512
company.logo.alt=Logo
#TRANSLATE
MyInfo.alt=Mes infos
#TRANSLATE       508
Help.alt=Aide

###########################################################################################

Help Text -

###########################################################################################
#NOTR
helptext.save_and_continue=Enregistrer cette d\u00E9pense et cr\u00E9er un autre \u00E91\u00E9ment
    de d\u00E9pense
#TRANSLATE
help_text.cancel=Annuler les modifications
#NOTR                                  520
help_text.save=Save changes
#TRANSLATE
help_text.done=Terminer  512
#TRANSLATE
help_text.ok=Saisie des donn\u00E9es termin\u00E9e
#NOTR                                   520
help_text.up=Move this item up in the list
#NOTR     516
help_text.down=Move this item down in the list
#NOTR                                                          508
help_text.continue_entry=Load the form for the selected expense type
#NOTR
help_text.continue_employee=Load the form for the selected Group
#TRANSLATE
help_text.sort_asc=Trier la colonne par ordre croissant
#TRANSLATE
help_text.sort_dsc=Trier la colonne par ordre d\u00E9croissant
#TRANSLATE                            520
help_text.back=Enregistrer et retourner
#TRANSLATE
help_text.next=Enregistrer et continuer
#TRANSLATE
help_text.help=Cliquez ici pour obtenir de l'aide.
#TRANSLATE
help_text.myinfo=Cliquez ici pour acc\u00E9der \u00E0 Mes infos
#NOTR
help_text.skip_tutorial=Skip the Tutorial
```

FIG. 7B

| Repository | Source Key | Source Text | Translation | Feature | Status |
|---|---|---|---|---|---|
| cc1-translation | goodKey | Some text | | NewFeature | new |
| cc1-translation | betterKey | Other text | | BestFeature | new |
| cc1-translation | xBUT.save... | Save Project | Projekt speichern | ProjectActions | proposed |
| cc1-translation | xACT.share... | Share Project | Projekt tielen | ProjectActions | proposed |
| cc1-translation | xACT.delete | Delete Project | Projekt löschen | ProjectActions | translated |
| cc1-translation | xACT.push | Push Project | Projekt pushen | ProjectActions | translated |
| demo2 | but.text | Save | | FileActions | new |
| demo2 | but.quit | Exit | Puka | AppActions | translated |
| demo2 | tt.generalInfo... | General Inform... | 'Ike äkea | Help | translated |
| demo2 | tt.workflow... | Process | Ka'ina hana | ProcessViewer | translated |
| demo2 | not.dberror... | Database Error | | Alerts | new |
| demo2 | Not.credenti... | Invalid Credenti... | | Security | new |
| workflowxyz | bt.filterAsc | Sort Ascending | | Visualization | new |
| workflowxyz | bt.filter.Dsc | Sort Descending | Legg til prosesst... | Visualization | translated |
| workflowxyz | bt.newStep | Add Process Step | Ugyldig sekvens | WorkflowEdit | translated |
| workflowxyz | Alrt.sequence | Invalid Sequence | åndsverk | Alert | translated |
| workflowxyz | dd.country | Country | | Configuration | new |
| workflowxyz | dd.tag.categ... | Intellectual Property | ach amháin | Configuration | translated |
| db1 update | bt.save | Save | Cuir ar ceal | GeneralActions | translated |
| db1 update | bt.cancel | Cancel | | GeneralActions | translated |

Translation

Source Text
Database error

Translation hō'ai'e ka 'ikepili

Save   Preview

Metadata   MLTR   MT   Comments

MLTR Suggestions hō'aiho hewa kikowaena

'Āpana hema pilikia 'ikepili

FIG. 9C

Translation

Source Text
Database error

Translation hōʻaiʻe ka ʻikepili

[Save] [Preview]

○ ○ ●―1046 ○
3
Metadata   MLTR   MT   Comments hōʻaiʻe ka ʻikepili ―1060

[Use Suggestion] ―1062

1040

| Repository | Source Key | Source Text | Translation | Feature | Status |
|---|---|---|---|---|---|
| cc1-translation | goodKey | Some text | | NewFeature | new |
| cc1-translation | betterKey | Other text | | BestFeature | new |
| cc1-translation | xBUT.save... | Save Project | Projekt speichern | ProjectActions | proposed |
| cc1-translation | xACT.share... | Share Project | Projekt tielen | ProjectActions | proposed |
| cc1-translation | xACT.delete | Delete Project | Projekt löschen | ProjectActions | translated |
| cc1-translation | xACT.push | Push Project | Projekt pushen | ProjectActions | translated |
| demo2 | but.text | Save | | FileActions | new |
| demo2 | but.quit | Exit | Puka | AppActions | translated |
| demo2 | tt.generalInfo... | General Inform... | ʻike ākea | Help | translated |
| demo2 | tt.workflow... | Process | Kaʻina hana | ProcessViewer | translated |
| demo2 | not.dberror... | Database Error | | Alerts | new |
| demo2 | Not.credenti... | Invalid Credenti... | | Security | new |
| workflowxyz | bt.filterAsc | Sort Ascending | | Visualization | new |
| workflowxyz | bt.filter.Dsc | Sort Descending | | Visualization | new |
| workflowxyz | bt.newStep | Add Process Step | Legg til prosesst... | WorkflowEdit | translated |
| workflowxyz | Alrt.sequence | Invalid Sequence | Ugyldig sekvens | Alert | translated |
| workflowxyz | dd.country | Country | | Configuration | new |
| workflowxyz | dd.tag.categ... | Intellectual Property | åndsverk | Configuration | translated |
| db1update | bt.save | Save | ach amháin | GeneralActions | translated |
| db1update | bt.cancel | Cancel | Cuir ar ceal | GeneralActions | translated |

File Upload Project Details

Project Metadata — 1114
- Account Name: — 1116
- Developer Name:
- Project Name: — 1118
- File Type: — 1120
- Escape Non-ASCII Characters: Yes — 1122
- Domain: — 1124
- Source Language: — 1126
- Target Languages: — 1128

Project Configuration
- Post-Editing Required: No — 1130
- Review Required: No — 1132
- Use Company MLTR: Yes — 1134

FIG. 9F

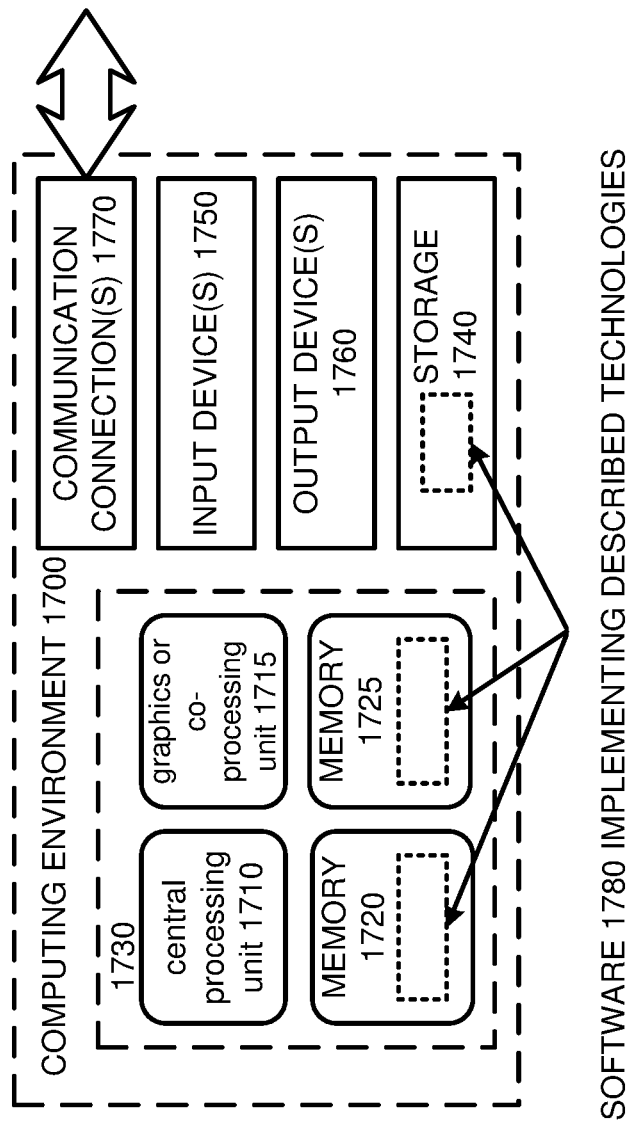

STRING EXTRACTION AND TRANSLATION SERVICE

FIELD

The present disclosure generally relates to facilitating the process of translating strings between human languages. Particular embodiments provide a translation service that extracts strings to be translated, facilitating translation by a human or machine translation.

BACKGROUND

Often, software applications are initially written for use by users who write or speak a particular language. For example, various user interface controls, such as button or icon labels, alerts or notifications, or tool tips, have text in a first human language (i.e., not a programming language). However, the software applications may be adapted for use by users who write or speak a different language. As an example, a program originally written for users who speak German may be adapted for users who speak English, French, Chinese, etc. In some cases, programs can be written to help facilitate localizing software for a particular language, such as including control labels in a file, where the file can be accessed to apply appropriate language elements to a user interface. For instance, a language file can be loaded at program start up, or can be linked and included in a compilation process so that executable code includes user interface elements having text associated with the elements in the language file.

However, translating text associated with user interface elements can be tedious, time, consuming, and error-prone. Accordingly, room for improvement exists.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

Techniques and solutions are described for translating strings in a human language that are associated with code, such as code that declares user interface elements in association with which the strings can be displayed. The strings can be embedded in code, or can be included in files that are accessed by the code or used in creating executable code. Strings can be extracted from data, such as files, received in a translation request. After translation, such as by a human translator or using machine translation, the translation results can be provided in response to the translation request. The translation process can be automated, such that changes to files in a code repository can trigger a translation request. Disclosed technologies can facilitate the production of programs that are localized using different human languages.

In one aspect, a method is provided for processing a translation request. A translation request is received through an interface, such as an application program interface (API). The translation request includes a first plurality of strings in a first human language. At least a portion of the first plurality of strings are extracted as a corresponding plurality of segments. The plurality of segments are stored in a data store.

One or more of the saved segments are displayed to a user. User input is received from the user providing a translation for the displayed one or more saved segments. The stored one or more saved segments are updated with the translation. Translation results are provided in response to the translation request. The translation results include a second plurality of strings in a second human language. The second plurality of strings corresponds to the at least a portion of the first plurality of strings.

In another aspect, another method is provided for processing a translation request. A translation request that includes one or more files is received. Files of the one or more files include, for respective strings of a first plurality of strings in a first human language, a source key and a source value that includes one or more strings of the first plurality of strings. The source key identifies one or more user interface elements of a user interface generated from program code that is generated based at least in part on the one or more files.

For at least a first portion of strings of the first plurality of strings, a source segment is created. A given source segment includes the source key and the source value for a respective string of the first plurality of strings. A translation of source values of at least a second portion of strings of the first plurality of strings is requested. A plurality of target segments are created. A given target segment includes a source key of a source segment and a translated string corresponding to the respective string of the first plurality of strings translated into a second human language. Translation results are returned in response to the translation request. The translation results include at least a portion of the translated strings.

In a further aspect, a method is provided for automatically translating strings associated with files in a code repository. It is determined that one or more files of a code repository have been modified. It is determined that at least one of the one or more files includes a first set of one or more strings designated to be translated from a first human language. A translation request to a translation service is generated. The translation request includes the first set of one or more strings. Translation results are received. The translation results include a second set of one or more strings. The second set of one or more strings corresponds to the first set of one or more strings translated from the first human language to a second human language.

The present disclosure also includes computing systems and tangible, non-transitory computer readable storage media configured to carry out, or including instructions for carrying out, an above-described method. As described herein, a variety of other features and advantages can be incorporated into the technologies as desired.

BRIEF DESCRIPTION OF THE DRAWINGS

FIGS. 5A-7B are example properties files in various languages, and which can represent a source file and target files produced by translating at least certain strings included in the source file.

FIGS. 9A-9K are example user interface screens, or components thereof, that can be used in implementing various aspects of a translation process according to disclosed technologies.

FIG. 11 is a diagram of an example computing system in which some described embodiments can be implemented.

DETAILED DESCRIPTION

Example 1—Overview

Figure 1:
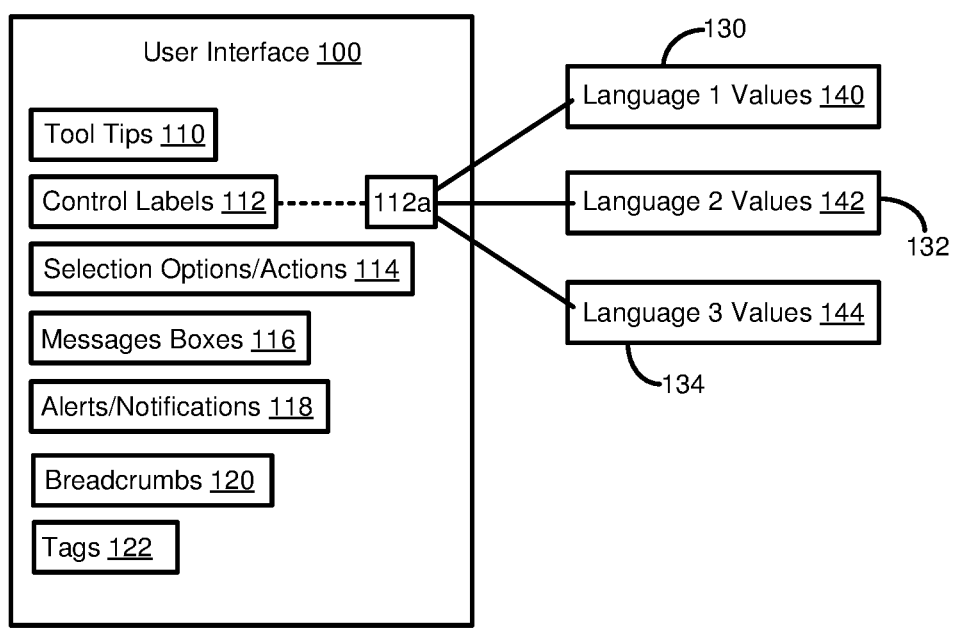
FIG. 1 is a diagram illustrating how user interface elements can be associated with text in different languages.

Often, software applications are initially written for use by users who write or speak a particular language. For example, various user interface controls, such as button or icon labels, alerts or notifications, or tool tips, have text in a first human language (i.e., not a programming language). However, the software applications may be adapted for use by users who write or speak a different language. As an example, a program originally written for users who speak German may be adapted for users who speak English, French, Chinese, etc. In some cases, programs can be written to help facilitate localizing software for a particular language, such as including control labels in a file, where the file can be accessed to apply appropriate language elements to a user interface. For instance, a language file can be loaded at program start up, or can be linked and included in a compilation process so that executable code includes user interface elements having text associated with the elements in the language file.

However, translating text associated with user interface elements can be tedious, time-consuming, and error-prone. For example, it may be difficult for developers or translators to determine when new terms need to be translated. Because of the difficulty, updates may be released less frequently to avoid translation issues, or may require more development time and effort. Delays can arise if translation is only undertaken after program code is complete, rather than translating strings as code is being developed. Problems can arise if a term is overlooked for a translation. Accordingly, room for improvement exists.

The present disclosure provides technologies for facilitating translation of human-language elements in computer code, particularly elements that will be displayed to end users during runtime for the application, such as text associated with user interface elements. According to one aspect, upon particular triggers, such as the commit of a code revision, the code can be scanned to determine whether any language elements have been added, changed, or deleted. If language elements have been added or changed, a translation process can be initiated.

In one implementation, the translation process includes submitting language elements in a source language to a machine translation service. Translations provided by the machine translation service can be included in a target file that includes translations in a target language. In some cases, the machine translation, either in the target file or prior to being incorporated into a target file, can be presented to a user, such as a translator. The translator can review and approve or change the translation suggested by the machine translation service.

In another implementation, when added or modified language elements are detected, those elements can be extracted from the computer code and presented to a translator for translation. The translator can manually translate strings in the source language into one or more target languages, or can optionally use one or more machine translation services to provide the translation, or to provide suggested translations which the translator can then accept or reject. If the translator approves of translations, the translations can be included in a target file. In some cases, a proposed translation can be assigned a confidence value or other indication of quality to help a user decide whether to accept a proposed machine translation.

In addition, or alternatively, to suggestions provided by a machine translation service, a database can be searched for identical or similar terms that have already been translated. Thus, the disclosed technology can leverage prior translation work to eliminate or reduce future translation work, as well as potentially improving translation accuracy. In some cases, the database can include custom dictionaries, or information that can be used to form a subset of the database that can be considered a custom dictionary. For example, a particular entity, or a particular group or project, may use specific terminology, which can be terminology that is unique to the entity/group/project, or can be more general terms where a specific or specialized meaning is associated with a given term for an entity/group/project, rather than some other meaning. By searching custom dictionaries, it can be more likely that the correct translation can be provided.

The above techniques can be used alone or in combination. For example, a database can first be searched. If matches are not found, terms can be submitted to a machine translation service. Or, a database can be searched if machine translations are not available, or are not available with sufficient confidence. In further scenarios, a user can be provided with proposed results from both a dictionary search and from machine translation.

Among other advantages, disclosed technologies can facilitate ongoing translation—that is, translation is facilitated during software development (e.g., continuously/in real time, at intervals, upon triggers, such as a commit operation, or a combination thereof), rather than always having translation occur after software development is complete (or essentially complete). Translation can be facilitated by detecting when changed or new terms are available to be translated and automatically translating these terms or notifying a translator that terms are awaiting translation.

Further, when a translation request is generated (e.g., because of a commit to a repository), rather than sending all terms to a translator or translation service, only changed/new terms can be presented to the translator or service, which can speed translation. For example, a translator can be presented only with text requiring translation, rather than presenting them also with terms that have already been translated. These translation requests can also be referred to as "deltas" since they represent changes to terms requiring translation between two code versions. That is, a translation request provided to a translation service can include all terms that might require translation, even if they have already been translated, or just a delta. Similarly, terms presented to a translator or automatic translation service can include all terms in a translation request or delta, or, if a translation request was received by the translation service, the translation service can calculate the delta and present that to the translator or automatic translation service. By helping a translator identify terms needing translation, a translator is facilitated in concurrently working with multiple projects/code associated with multiple repositories.

Example 2—Example Localizable User Interface

FIG. 1 illustrates various types of text that can be translated using the disclosed technologies. That is, while the disclosed technologies can be used to translate other types of text that will be presented to a human user, where typically it is the end user, rather than the developer or programmer, who is of particular interest. As used herein, "language elements" refers to these human-language textual features that will be presented to an end user, even though the textual features may also be viewed or edited by other users, such as developers or translators. Language elements are text that is displayed, or is available for display, during application runtime, as opposed to text, even if in a human language, that only appears in source code. Code comments, for example, can include human-language text, as they are intended for human consumption and are not converted to machine-implementable instructions. However, code comments would not be considered to be "language elements." As discussed above, however, disclosed technologies can be applied to human-language textual features, such as code comments, in addition to language elements. In addition, while in some cases language elements are separate from code, in other cases language elements can be embedded in code (e.g., the text to be displayed for a button of a user interface can be specified in program code that declares/defines the button).

As language elements are displayed to an end user, the language elements are typically those associated with a user interface (UI), and more particularly a graphical user interface (GUI). FIG. 1 illustrates that a user interface 100 can have a number of different types of user interface elements or controls. These user interface elements or controls can include tool tips 110, control labels 112 (e.g., labels for buttons or other selectable icons, including selectable text that triggers some action), selection options or actions 114 (e.g., options provided in a picker or drop down menu), message boxes 116 (e.g., text explaining the purpose of a input field), alerts or notifications 118 (e.g., messages regarding errors, status of various actions), breadcrumbs 120, and tags 122 (e.g., labels that can be selected by the user and applied to various objects).

The one or more language elements of the user interface 100 are associated with a first language, which can be a source language. A language element can be translated into one or more target languages. In some cases, a language can be translated from a source language to a first target language, and then from the first target language to a second target language. For the conversion from the first target language to the second target language, the first target language can be referred to as the "original language." For example, if source text is in German, German can be the original language. If the text is translated from German to English, English can be the target language, while German is both the source language and the original language. If the English translation is then translated to Japanese, English can be the source language, while German remains the original language.

Again, as used herein, unless other specified (either explicitly or by context), language refers to a human language (e.g., German, English), as opposed to a programming language (e.g., C++, Python), even if the programming language is designed to be read and interpreted by humans, and may be converted to another form (e.g., assembly language or machine language) to be executed by a computer. FIG. 1 illustrates how a given user interface element, such as a control label 112a (e.g., for a "save" button), can be associated with a first language 130, but can also be associated with other languages, such as a second language 132 and a third language 134. Each of the languages 130, 132, 134 includes a respective value 140, 142, 144, where the value provides the text that will be displayed on the user interface for the control label 112a. For example, the values 140, 142, 144 can be, respectively, "speichern," "save," and "sauvegarder."

Example 3—Example Architecture with Translation Infrastructure

Figure 2:
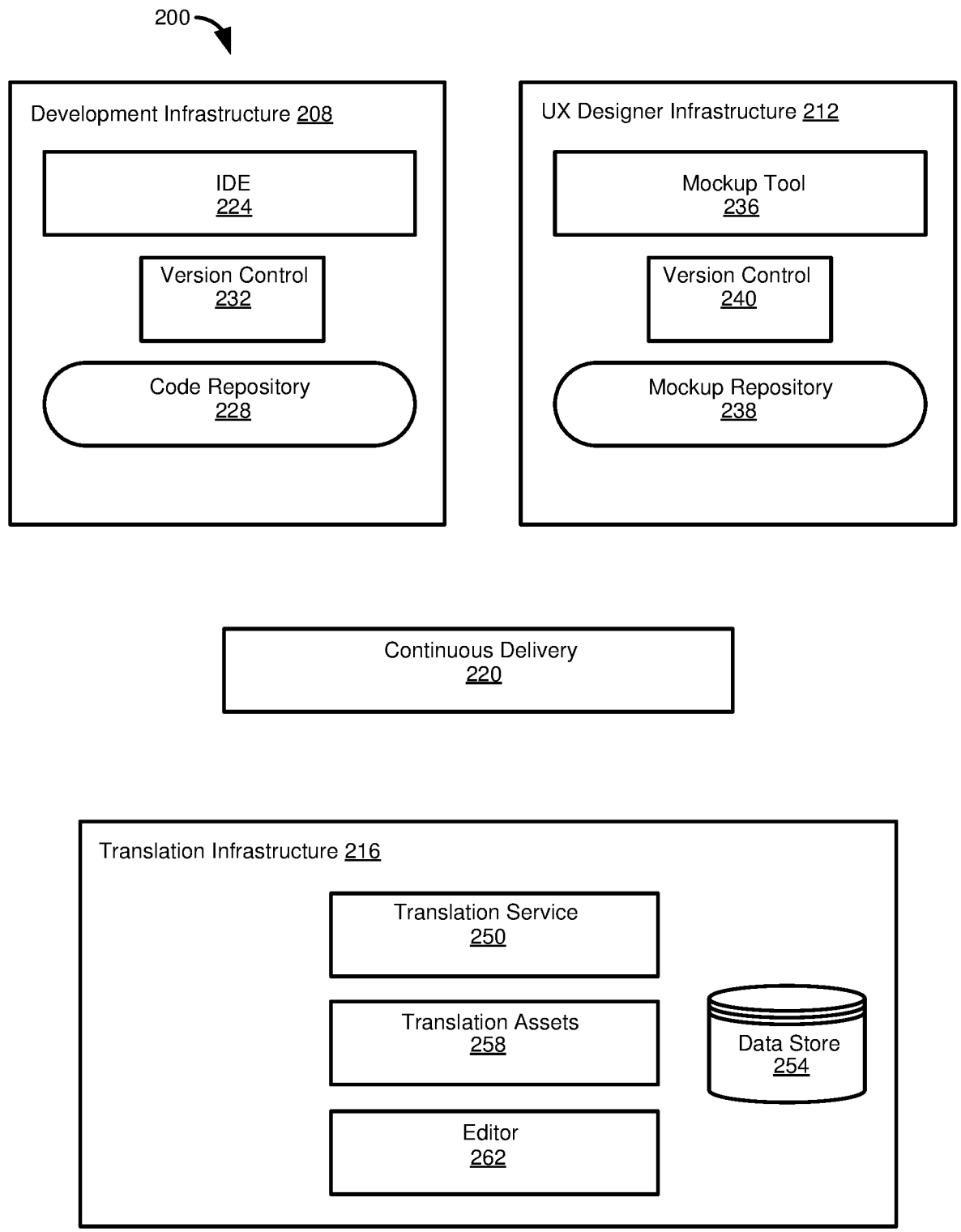
FIG. 2 is a diagram illustrating a generalized computing architecture in which disclosed technologies can be implemented.

FIG. 2 illustrates a computing environment 200 in which disclosed embodiments may be implemented. The computing environment 200 generally includes a development infrastructure 208, a user interface/user experience (UI/UX) infrastructure 212, a translation infrastructure 216, and a continuous delivery component 220 (which can be a pipeline integration component). Although shown as a single development infrastructure 208, the computing environment 200 can include multiple development infrastructures, or a development infrastructure can have multiple components.

The development infrastructure 208 can include an integrated development environment (IDE) 224. One or more developers can access the IDE 224 to create or modify application code. The application code can be stored in a code repository 228. A version control component 232 can communicate with the IDE 224 and the code repository 228, including tracking versions (e.g., updates) to particular code, and can be used to perform operations such as determining whether two code versions are the same, determining whether two code versions can be merged, or determining differences between code versions. The version control component 232 and the code repository 228 can be a common component, such as GIT (Software Freedom Conservancy, Brooklyn, N.Y., USA). In addition, although FIG. 2 shows a single code repository 228/single mockup repository 238, the translation service 216 can, in some implementations, be in communication with/receive translation requests from multiple code repositories/mockup repositories 228, including such repositories that are located in different development infrastructures 208 or UX designer infrastructures 212.

The UI/UX infrastructure 212 can include a mockup tool 236 that designers can use to develop UI components and evaluate a user experience for an application being developed. The mockup tool 236 can be associated with a mockup repository 238, where versions of mockups created using the mockup tool can be stored. A version control component 240 can communicate with the mockup tool 236 and the mockup repository 238, and can at least generally have functionality analogous to the version control component 232. Like the version control component 232, the version control component 240 can be a common component with the mockup repository 238.

Although shown as having different version control components 232, 240 and repositories 228, 238, in some cases the development infrastructure 208 and the UI/UX infrastructure 212 can have one or both of a common version control component or a repository. For example, both the development infrastructure 208 and the UI/UX infrastructure 212 can use GIT as the repositories 228, 238 and the version control components 232, 240.

The continuous delivery component 220 can, among other things, coordinate activities between the development infrastructure 208 or the UI/UX infrastructure 212 and the translation infrastructure 216. For example, a commit of changes, or another trigger, at the development infrastructure 208 or the UI/UX infrastructure 212, can cause various actions to be taken by the continuous delivery component 220. These actions can include determining whether code or UI/UX elements include text to be translated and, if so, forwarding the text to the translation infrastructure 216. In a particular example, the continuous delivery component 220 can be, or can include, the Jenkins automation software.

The translation infrastructure 216 can include a translation service 250. The translation service 250 can include APIs or other functionality for programs to request translation services, and can coordinate activities of the translation infrastructure. For example, the translation service 250 can receive translation requests from the continuous delivery component 220, or, in at least some cases, from the development infrastructure 208 or the UI/UX infrastructure 212, either directly or through one or more intermediary components. A translation request, including as generated by the continuous delivery component 220, can be based on one or both of text in the IDE 224 or the code repository 228.

The translation service 250 can record incoming translation requests, including storing information associated with such requests in a data store 254. For example, the data store 254 can store a submission, such as a file (e.g., a code file) that includes text to be translated, as well as information about the submission, such as a time the submission was sent or received or one or more identifiers of a source of the submission (e.g., source system, source application, user who submitted the request, etc.).

The translation service 250 can also extract translation assets 258 from a submission. Translation assets 258 can be discrete text strings, or collections of strings, that are to be translated. The translation assets 258 can optionally be stored in the data store 254.

Parsing submissions into discrete translation assets 258 can facilitate string translation by allowing human or automated translation (e.g., machine translation, using results of prior translations) of the strings to take place without a user or application having to separately extract strings from the submission. That is, for example, rather than looking through thousands of lines of code for strings that need translation, a translator can simply be provided with the strings that need translation.

Similarly, when extracting translation assets 258, the translation service 250 can include functionality to identify strings that have already been translated, or to otherwise determine differences between a new submission and a prior submission of the same code or project. Thus, rather than being presented with every string in a submission that might be marked for translation, a user can be presented only with strings that have been added to a new code version, or strings that have otherwise not yet been assigned a translation.

The translation service 250 can include an editor 262. The editor 262 can allow users to provide translations for translation assets 258 and optionally take other actions. For example, the editor 262 can allow a translator to provide comments that can be reviewed by users of the development infrastructure 208 or the UI/UX infrastructure 212.

Once strings in a submission have been translated, or the submission otherwise processed, a response can be provided by the translation service 250 to the development infrastructure 208 or the UI/UX infrastructure 212.

Various changes can be made to the computing environment 200. For example, in some cases, the data store 254 can be omitted. For example, particularly for automated translation, translation requests can be executed in-memory/on the fly, without an entire request (or in some cases a portion or any portion of a request) being persisted. Or, the data store 254 can be used, but transiently (e.g., deleting records when a translation request is complete or after a determined period of time). In this disclosure, it should be appreciated that process descriptions that include references to storing segments etc., such as in database records, can be carried out as described but without storing/retrieving information from a data store, including in database records, or can use a data store, but in a transient way.

Figure 3:
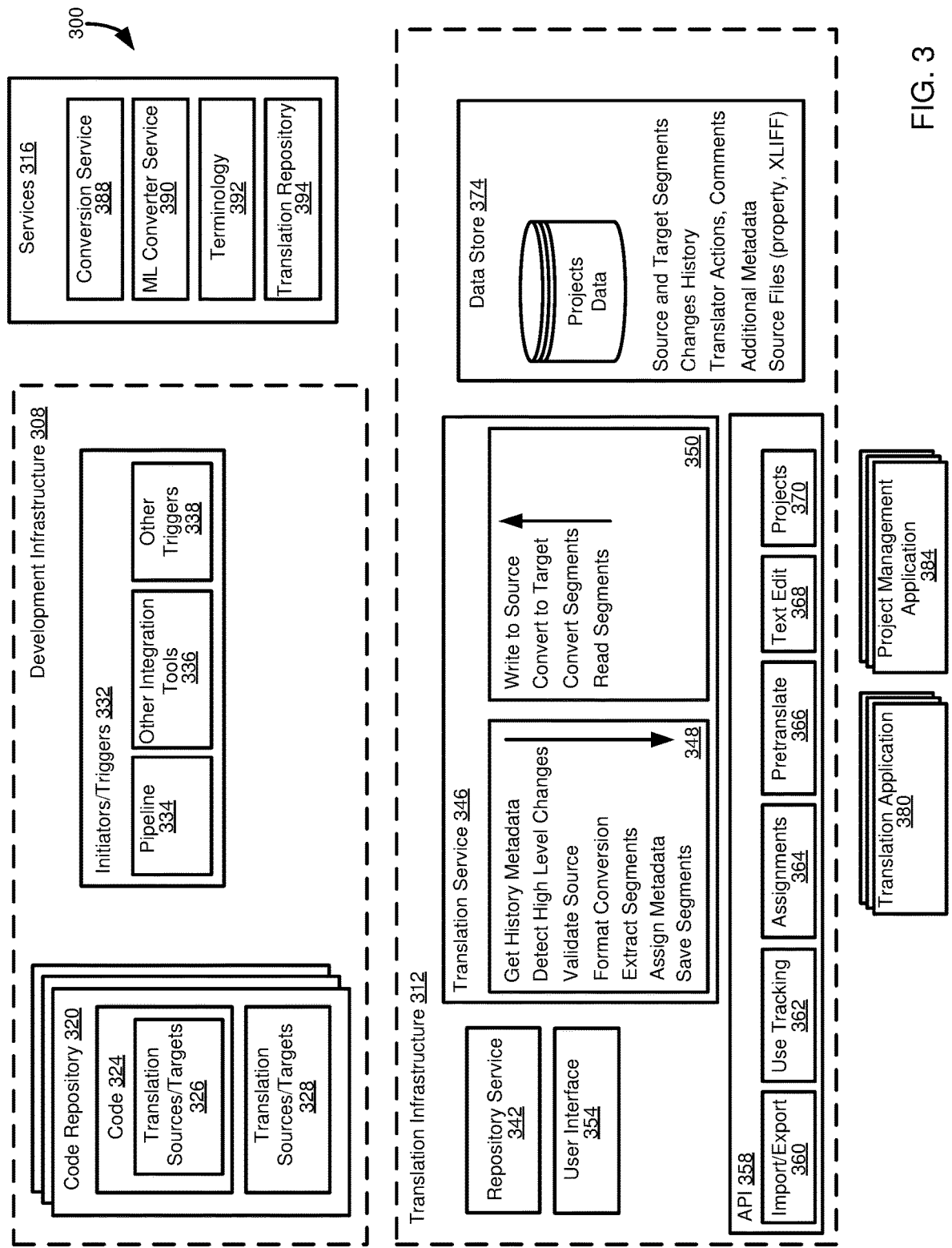
FIG. 3 is a diagram illustrating a computing architecture in which disclosed technologies can be implemented, including details for a translation infrastructure that includes an interface for receiving translation requests.

Example 4—Example Architecture with Translation Infrastructure Implementation and Interface FIG. 3 illustrates an architecture 300 in which disclosed technologies can be implemented. The architecture 300 generally includes a development infrastructure 308, a translation infrastructure 312, and optionally one or more services 316. The development infrastructure 308 includes a code repository 320, which can at least generally be implemented as described for the code repository 228 or the mockup repository 238 of FIG. 2. That is, although called a code repository 228, the code repository may contain information other than, or in addition to, program code.

In particular, the code repository 320 can include code 324 that includes or more translation sources or targets 326, where a translation source can be a string or collection of strings which are to be (or have been) translated and a translation target can be a string or collection of strings which were translated from a translation source, or which represent translations that are to be provided based on a translation source (e.g., placeholders for translated strings). The code repository 320 can also include translation sources or targets 328 which are not embedded in program code. In other words, strings to be translated using disclosed technologies can be embedded in program code or can be separate from program code, including in a file that will be accessed by program code, such as during program compilation or runtime.

The development infrastructure 308 can include one or more translation initiators or triggers 332. The translation initiators or triggers 332 can include a continuous delivery component 334, which can be the continuous delivery component 220 of FIG. 2, such as the Jenkins software. The translation initiators or triggers 332 can also include other integration tools 336, which can be, or be components of, a code repository (including the code repository 320) or a version control system. The translation initiators or triggers 332 can include other triggers 338, including functions or APIs that can be called (e.g., manually by a user) to initiate translation of translation sources.

The translation infrastructure 312 can include a repository service 342. The repository service 342 can facilitate communication with components of the development infrastructure 308, including the code repository 320. For example, the repository service 342 can provide an interface, such as an API, that can be called by the code repository 320 or the initiators/triggers 332.

The translation infrastructure 312 can include a translation service 346, which can coordinate translation activities for translation requests. For example, the translation service 346 can perform submission processing activities 348, which can include getting history metadata associated with a particular translation request, such as version information associated with a file or repository location (e.g., a file of the code repository 320 or a branch/location in the code repository). Submission processing activities 348 can include detecting high level changes, such as determining whether a repository location includes a new file. More granular changes can also be determined as part of the submission processing activities 348, such as determining whether two versions of a file (e.g., a code file or a file that includes a list of strings, at least some of which may be marked for translation) include changes, where a change can indicate one or more new strings to be translated.

Validating the source information, such as a source file, can also be performed as part of the submission processing activities 348. Validating a source file can include determining whether the file, or request information generally, has the appropriate format, is free of syntax errors, or other checks. In some cases, the submission processing activities 348 can include converting a format of a submission. For example, a submission may be provided in the form of properties files or code, which can be converted to a format that facilitates translation activities, such as converting the submission to the XLIFF (XML Localization Interchange File Format) format, or another interchange or standardized format.

Segments, particular strings or sets of strings (e.g., strings in a particular sentence, phrase, etc.), can be extracted as part of the submission processing activities 348, including extracting the segments from a submission in a converted format, such as XLIFF. Metadata can be assigned to the segments, where the metadata can identify information associated with the submission, such as when the submission was received and information regarding the source of the submission, such as the identity of a system, application, or user which submitted the request. The segments can then be saved and provided to a human translator or to an automated translation service (e.g., that provides machine translations or identifies previous translations that may be used). In some cases, segments can be provided as key/value pairs, where a key identifies a particular program element, such as a user interface element, with which the string will be used and the value provides the actual string text.

The translation service 346 can also perform response processing activities 350. As part of the response processing activities 350, translated segments can be read. The segments can then be converted to a particular format that is useful in translation processing, such as XLIFF. If the response is to be provided in another format, such as in a properties file having a different format or embedded in code, the translated strings can be converted to such format as part of the response processing activities 350. The results can then be returned to the development infrastructure 308.

The translation infrastructure 312 can optionally provide one or more user interfaces 354. The user interfaces 354 can include a web-based user interface, including a web-based user interface based on REST services. However, the user interface 354 can also include a user interface provided by an application that provides access to various components of the translation infrastructure 312.

The translation infrastructure 312 can provide an interface, such as an API 358, for performing operations using the translation infrastructure, including viewing details regarding translations performed using the translation infrastructure, performing such translations, or configuring settings for the translation infrastructure. The API 358 can be provided by the repository service 342, in some cases. In other cases, all or a portion of the functions of the API can be carried out by another component of the translation infrastructure 312.

The API 358 can include import/export functionality 360, which can be used to import/export text to be translated/translation results, including text that is part of a larger file or collection, such as text included in code or properties files. The import/export functionality 360 can be used as part of the submission processing activities of the response processing activities 350.

The API 358 can include a use tracking component 362. The use tracking component 362 can be used to track use of the translation infrastructure 312. For example, the use tracking component 362 can be useful when the transaction infrastructure 312 is provided on a cost per use basis or under a subscription that provides limits on submissions that can be provided to the translation infrastructure 312. The use tracking component 362 can also be useful in tracking use of the translation infrastructure 312 for reporting/project management purposes, including to help plan computing resources that should be allocated to the translation infrastructure (e.g., an amount of processing, memory, storage, or network resources available to the translation infrastructure).

The API 358 can include an assignments function 364. The assignments function 364 can be used to designate how a particular translation submission, or part thereof, should be translated. For example, the assignments function 364 can be used to assign a particular human translation to the submission, or to specify that a particular automated translation service should be used.

A pretranslation function 366 can be included as part of the API 358. The pretranslation function 366 can be used to obtain suggestions that can be reviewed by a human translator assigned to a particular translation request. The pretranslation function 366 can result in segments being submitted to an automatic translation service, such as a machine translation service or a look up service. The look up service can determine whether a particular term was previously translated and, if so, any prior translations can be provided as suggestions. Pretranslation can facilitate translation by a human translator, such as if the human translator agrees with a suggestion provided by a machine translation service or a look up service. However, having the human translator review the results of pretranslation can be useful, as suggestions provided through pretranslation may be incorrect, including because the term was previously translated in a different context, or the machine translation assumed the term was being used in a different context than intended for the segment in the source language.

The API 358 can include a text edit function 368. The text edit function 368 can be used to input, or change, a translation provided for a segment to be translated (i.e., a source segment or source text). In some cases, the text edit function 368 can also be used to change text for the source segment or text itself. For example, it may be that the source text, in the source language, was determined by the translator to be incorrect, or more appropriate terms might have been determined for the source text.

A projects function 370 can be included for the API 358. The projects function 370 can be used to define, adjust, and track projects involving the translation infrastructure 312. For example, using the projects function 370, a user may define a project, including based on particular elements (e.g., files, branches) included in the code repository 320. For a given project, information such as translators assigned to the project, a number of segments translated, a number of segments remaining to be translated, and project deadlines can be tracked.

The translation infrastructure 312 can include, or have access to, a data store 374. The data store 374 can store project data, submission data, response data, and additional information. For example, the data store 374 can store data submitted for translation (e.g., code or text files) or responses provided in response to a translation request. The data store 374 can store segments, including source text to be translated and translated target text in one or more languages that corresponds to the source text. Additional information stored in the data store 374 can include translator comments, which can be provided for an overall translation submission or project, or for particular segments. The comments may be provided by the translator for consideration by a software or UI/UX developer or designer, in some cases. For particular projects or data sources (e.g., files in the code repository 320), the data store 374 can store change information, such as when a particular segment was created or last updated, and identifiers of translators (or services) that created or updated the segment.

In addition to being accessible to the development infrastructure 308, the translation infrastructure 312 can be accessed by translation applications 380 or project management applications 384. The translation applications 380 can access the translation infrastructure 312 to view strings that are to be translated and to enter translations, as well as optionally providing other information, such as comments. The project management applications 384 can access the translation infrastructure 312 to define, modify, and view information related to particular projects, including viewing and editing project deadlines, and viewing a project status, such as a number of segments marked for translation and how many of such segments have been translated and how many segments remain to be translated. The project management applications 384 can also be used to create and modify assignments of translators to particular segments or collections of segments.

The services 316 can include a conversion service 388. The conversion service 388 can provide access to the translation infrastructure 312, which can allow the translation infrastructure to be used with clients in addition to the development infrastructure 308. The services 316 can include an automated translation service 390, which can provide machine translations, such as to be assigned as translation for segments or to be used to provide suggested translations for consideration by a human translator, including as part of a pretranslation process (e.g., using the pretranslation function 366), or other automated translations, such as identified in prior translation results (including potentially from other projects/repositories).

The services 316 can also include a terminology service 392. The terminology service 392 may be used, in some cases, to provide definitions for terms that may be included in segments for a particular project. The terminology service 392 may be useful in providing information to translators to help them determine the appropriate translation for a given segment.

A translation repository service 394 can also be included as a service 316. The translation repository service 394 can store translations for text terms or phrases, including translations facilitated by the translation infrastructure 312 or from other translation processes. In some cases, the translation repository service 394 can provide access to a translation repository that stores translations provided by multiple users or entities. Thus, the translation repository service 394 can help "crowdsource" translations and take advantage of prior work in translating terms and phrases, which can reduce translation time and improve translation accuracy for new translation requests.

Example 5—Example Data Model

Figure 4:
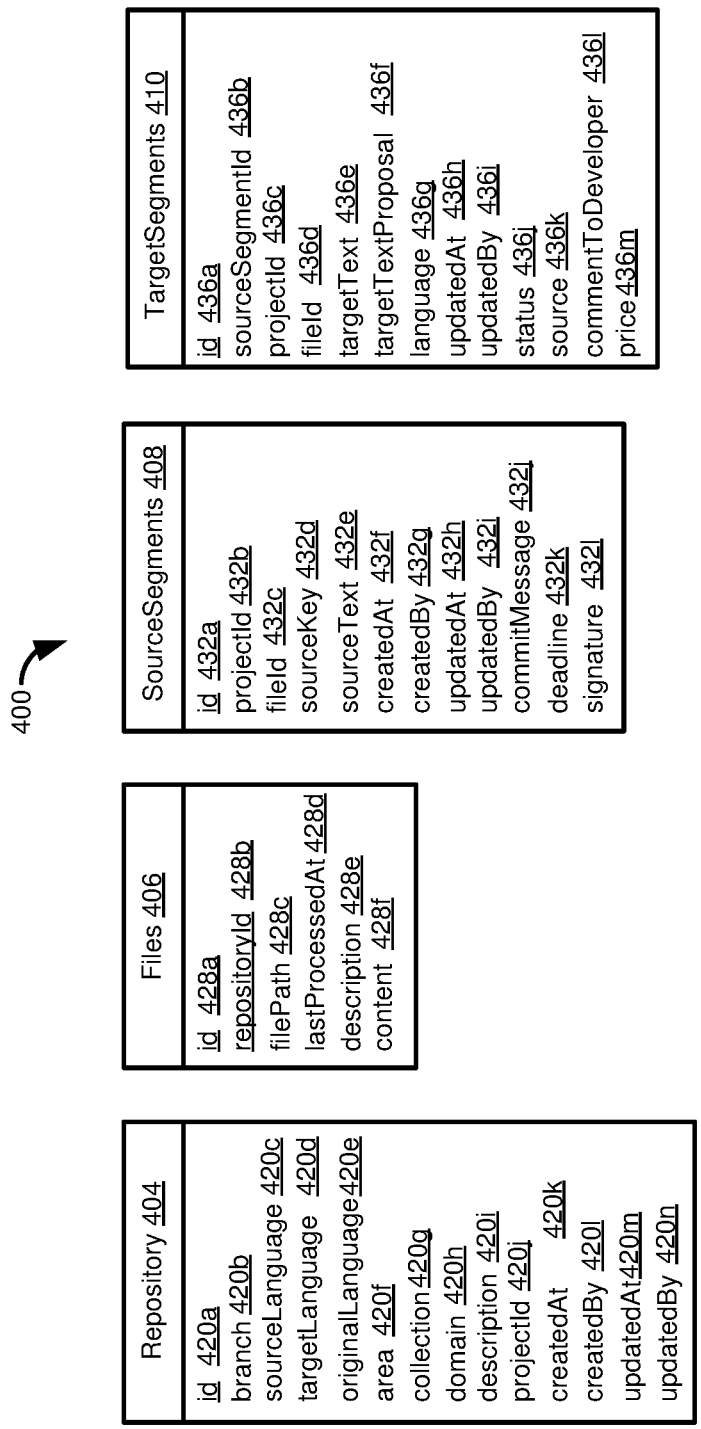
FIG. 4 illustrates an example data model that can be used in storing and processing translation requests.

FIG. 4 provides an example of elements of a data schema 400, or data model, that can be used with disclosed technologies. The data schema 400 can define a plurality of tables 404, 406, 408, 410 storing information for a translation submission. At least some of the information in the data schema 400 can also be used with translation responses for translation submissions.

The table 404 can store information associated with a particular repository (e.g., a particular code repository, or a particular location of a code repository). The repository table 404 can include a plurality of fields 420, including an identifier field 420a (which can be a unique, artificially generated identifier in at least some cases) for the repository, which can serve as a primary key for the repository table. A field 420b can identify a particular branch for the repository identified in the identifier field 420a.

Fields 420c, 420d can identify, respectively, a source language and one or more target languages for segments originating in the repository and branch identified by the fields 420a, 420b. The field 420d can indicate what languages a human or automated translator should translate source strings into. The field 420c can be useful for tracking purposes, as well as being displayable to human translators, and can be particularly useful when automated translations are to be used, either when automatically assigned as translation for strings or as suggestions provided as part of a pretranslation, since the source language can be specified for the automated translator. A field 420e can store an indicator of an original language for text associated with a given repository. Typically, the original language of field 420e is the same as the source language of the field 420c. However, in some cases, the text in the source language may have been generated from a different, original language.

Fields 420f-420i can store metadata describing a particular repository, such as an area 420f, collection 420g, a domain 420h (e.g., as used in products of SAP SE, of Walldorf, Germany, which can also be referred to as a subject field), and a description 420i. In some cases, the fields 420f-420i can be used to help assign strings to be translated to a particular human translator, configure a machine learning translator, or more accurately search a repository for prior translations.

Fields 420j-420n can be used to provide various tracking information for a repository. For example, one or more projects can be associated with the repository using a project id field 420j. A time/date the repository was created can be stored in field 420k, and an identifier of a user or software program that created the repository can be stored in field 420l. Similarly, when a repository is updated, the date/time of updating can be stored in field 420m, while the identity of the user or software program that created the update can be stored in a field 420n.

The table 406 stores information regarding files associated with a translation submission. A field 428a can store an identifier for the file, while a field 428b can store an identifier for the repository associated with the file. The field 428b can be the same as the field 420a. The fields 428a, 428b can serve as the primary key for the table 406. In other words, files in different repositories can have the same name, and a repository can have multiple files. However, each file in a given repository is unique.

A location of the file (e.g., a file path) can be provided in a field 428c. A field 428d can store when the file was last processed (which can include actually processing the file for any needed translations, or analyzing the file to determine whether any translations are needed, such as new strings having been introduced or existing strings changed). A description of the file can be stored in a field 428e. The actual contents of the file can be stored in a field 428f.

Fields 432 can be used to store information about source segments in the table 408. Each source segment can be associated with an identifier that is stored in an identifier field 432a, and which serves as the primary key for the table 408. Typically, the identifiers stored in the field 432a are unique identifiers, and can be randomly assigned (including using an incrementing counter, where "randomly assigned" can mean that the identifier is not based on the contents or other intrinsic properties of the segment).

A given record in the table 408 can be associated with a particular project using the project id field 432b, which can store the same information as the project id field 420j of table 404. Similarly, a file id field 432c can store a file identifier indicating the file where the source segment originated. The file id field 432c can correspond to the file id field 428b of table 406, or the value can be the combination of the file id field 428c and the repository id field 428d (e.g., the file id field 432c can store a primary key value for table 406).

In some cases, segments can be identified in a file using combinations of keys and values (e.g., as in a JSON object or similar data format). The key can be stored in a field 428d and the value, the text of the string to be translated, can be stored in a source text field 428e.

A field 432f can store a value indicating when the particular segment was created, and a field 428g can store an identifier for a user or software program that created the segment. Similarly, a field 432h can store a date/time the segment was last modified, and a field 432i can store an identifier for a user or software program that last modified the segment.

A field 432j can include store a message associated with the string that was included when a particular repository update was committed. In some cases, the message included in the field 432j can be a message generally associated with the repository or file in which the segment is contained. In other cases, the message in the field 432j can be specific for the particular segment record entered in the table 408. For example, the message in the field 432j can be a comment that might be useable to a translator in translating the string for the segment, such as providing contextual information that may affect translation.

In many cases, translation projects, or components thereof, such as individual segments, can be associated with deadlines. These deadlines can be used, among other things, to help translators prioritize their translation work. A deadline for translating a segment can be included in a field 432k.

A field 432l can store a signature for the segment. The signature can be, for example, a hash value generated from the other fields 432a-432k, and can serve as another identifier for a given segment. The signature can be useful in determining whether particular text/a particular segment has changed (e.g., hash values can be compared rather than character-by-character string comparison). Signatures can be particularly useful when a segment has multiple words/phrases, as a change to any word/phrase will result in a different hash value. If a signature has not changed, results from a prior translation (or the original request) can be provided in a translation response.

The table 410 stores information regarding target segments—segments generated as part of a translation submission from a source segment, such as a source segment stored as a record of the table 408. In some cases, a given source segment may be translated into multiple languages, and so there can be multiple entries for target segments in the table 410 that correspond to a source segment record of the table 408.

Each target segment can be associated with an identifier that is stored in an identifier field 436a, and which serves as the primary key for the table 410. Typically, the identifiers stored in the field 436a are unique identifiers, and can be randomly assigned (including using an incrementing counter, where "randomly assigned" can mean that the identifier is not based on the contents or other intrinsic properties of the segment).

A given record in the table 410 can be associated with a particular project using the project id field 436b, which can store the same information as the project id field 420j of table 404 or the project id field 432b of table 408. Similarly, a file id field 436c can store a file identifier indicating the file where the source segment originated. The file id field 436c can correspond to the file id field 428b of table 406, or the value can be the combination of the file id field 428c and the repository id field 428d (e.g., the file id field 436c can store a primary key value for table 406).

A field 436e can store a value for the target segment, which can represent a translated string, such as a particular translation of a particular source text field 432e of a record in the source segment table 408. The value provided in the field 436e can be a value provided by a human translator or by an automated translation service. In at least some cases, suggestions, such as based on machine translations or from searches of prior translations, can be used in a pretranslation process that provides suggestions to a human translator (or which, in particular implementations, can be provided to a machine learning model). These translation proposals can be stored in a target text proposal field 436f.

A field 436g can store a language associated with the target segment. Although not described in table 408, table 408 can also include a language field, which can be used to indicate to a human or machine learning translator what language the text in the source text field 432e is in.

A field 436h can store a value indicating a date/time the target segment was last modified, and a field 436i can store an identifier for a user or software program that last modified the segment.

A status of a target segment can be indicated in a field 436j. For example, a status can indicate that a target segment is newly entered into the system, is awaiting pretranslation, has been pretranslated but is awaiting translation or confirmation, is awaiting translation, has been translated but is awaiting review or confirmation, is translated and ready for transmission back to the source system (e.g., a code repository), or has been translated and was previously sent to the source system.

A source field 436k can be used to identify a source of the translation segment, such as an identifier of a particular human translator or automated translation service. In some cases, a translator or translation service may wish to provide a comment back to a developer of the code associated with the translated segment. The comment can be stored in a field 436l. The comment can be, for example, a comment regarding the confidence of the translation, possible alternative translations, or questions about the corresponding source segment.

In some cases, translation can be provided on a fee-for-service basis. A cost associated with the translation can be included in a field 436*m*.

Example 6—Example Properties Files, Usable as Translation Source Files or Translation Target Files FIGS. 5A and 5B illustrate a properties file 500 that includes a plurality of strings that may be submitted to a translation service according to the present disclosure. The properties file 500 can be configured to be referenced by code, such as during code compilation or during runtime.

The properties file 500 is formatted such that a plurality of segments 508 are defined, where a given segment includes a tag 512, a key 516, and a value 520. The tags 512 can be used to indicate whether a given segment should be translated or not. For example, tags 512*a*, having the notation "NOTR," can be used to designate segments that are not to be translated. While tag 512*b*, "TRANSLATE," indicates that the segment should be translated.

Segments that are marked with a non-translation tag can be handled in various ways. In some cases, segments that are marked with a non-translation tag can be processed in an analogous manner as segments with tags that indicate that a segment should be translated. For example, segments can be parsed in a submission evaluation process and can be included in a segment table. However, the segments, such as in a source segment table, can be marked with an identifier indicating that the segments do not require translation.

In other cases, segments with non-translation tags can be subject to reduced processing. For instance, when a code version is updated, changes to segments that are marked as not-translated may not trigger a translation process. If other segments do trigger a translation process (e.g., there are new or updated segments with tags indicating that the segments are to be translated), segments with tags that are marked as non-translated can be omitted from a submission to a translation service. Or, the translation service can recognize non-translated segments and omit them from further processing. For example, if files are sent to the translation service, rather than extracted segments, the translation service can extract segments. When extracting segments, non-translated segments can be skipped and not further processed.

In some cases, a key 516 can be a variable name, including a name of an instance of an abstract or composite datatype. For example, and as shown in FIG. 5A, a key 516 can be the name of a particular user interface control, such as "button.cancel." The value 520 can be particular text, such as one or more words, numbers, symbols, or a combination thereof, that typically have meaning in a source language and, if the tag indicates that the text should be translated, are to be translated to one or more target languages.

Typically, a particular file, whether a properties file or a code file, includes particular keywords and syntax elements that allow segments to be recognized. For example, "#TRANSLATE" and "#NOTR" can be used as flags to indicate whether a particular key/value pair should be translated. Text following the tag, up until a whitespace and an "=" can represent the identity of the key 516, while text following the equality sign/assignment operator can represent the value 520, at least until a line break or other delimiter is encountered.

Of course, these keywords and syntax elements are provided by way of example only. Any suitable convention can be used to distinguish between tags 512, keys 516, and values 520. In addition, certain elements, such as tags 512, can be omitted, at least in some embodiments. For example, all key 516/value 520 pairs to be translated can be included in a particular file or files that are designated as having segments for translation. Strings that do not require translation can be included in other files, or can be embedded in program code.

FIGS. 6A, 6B and 7A, 7B illustrate the contents of the properties file 500, but translated into different (target) languages, as target properties files 600, 700, respectively. As shown, the content of the target properties files 600, 700 is structured in an analogous manner as the properties file 500, including segments 508 having tags 512, keys 516, and values 520. In some cases, when a properties file 600, 700 is created, the content of the file 500 can be copied into the file 600, 700, at least with the exception of values 520 for segments having tags 512 indicating that the segment should be translated.

For segments that were translated, the files 600, 700 can include as values 520 the translated values received from the translation service. If values 520 were not received for some segments, depending on implementation, the value 520 can be a standard value indicated that a translation was not received (e.g., "NULL," "UNDEFINED"). The value 520 for such segments can be the value 520 from the file 500 (e.g., the untranslated source text), and optionally a note (such as a comment) can be included to indicate that the value 520 is the untranslated value and a translated value was not received from the translation service.

In some cases, if segments to be translated, and translated segments, are embedded in program code, they can be identified for a translation service (or otherwise marked to facilitate extraction and transaction), including using the notation described with respect to FIGS. 5-7.

Example 7—Example Source Segment Table

Figure 8:
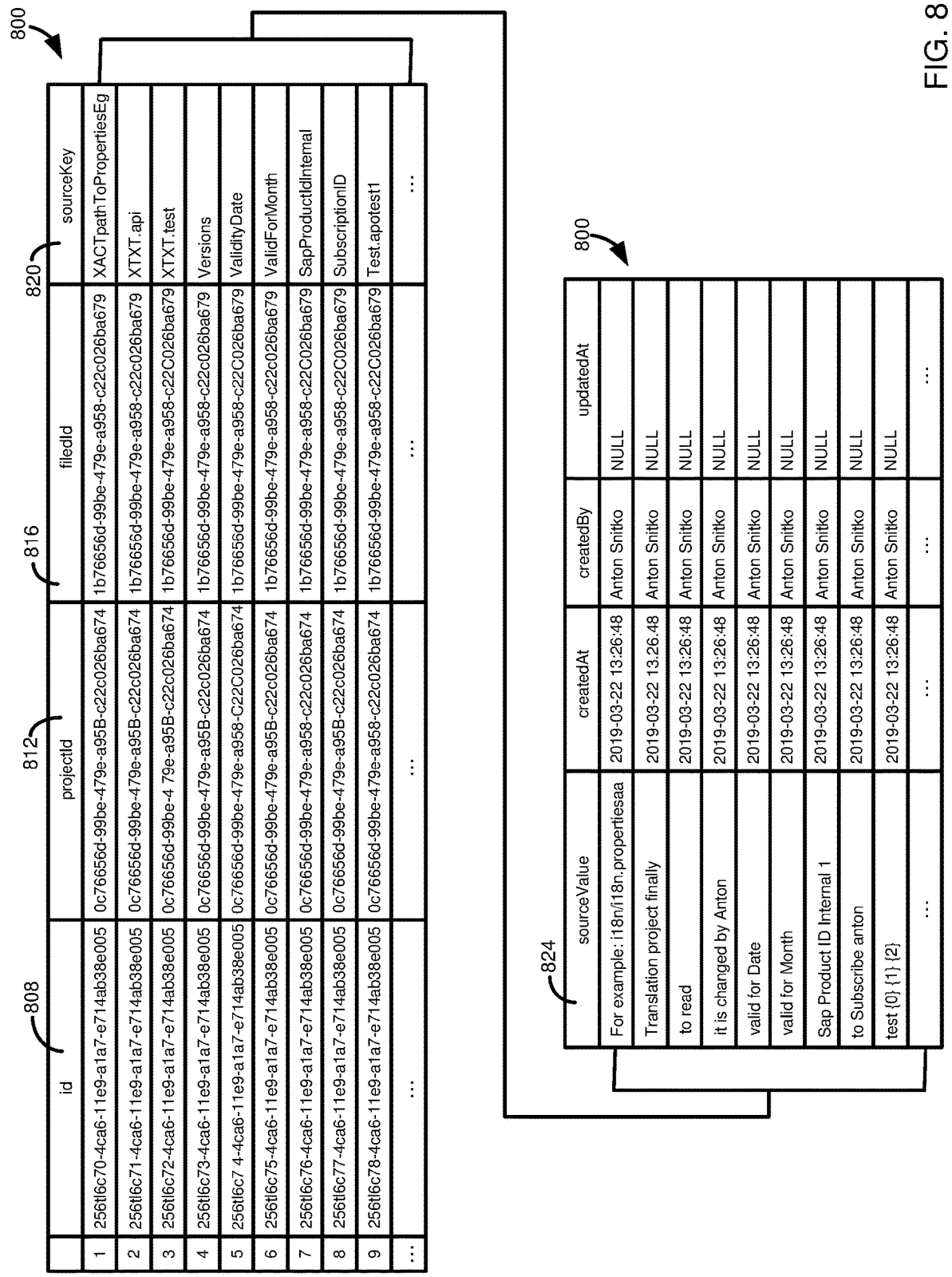
FIG. 8 is an example database table for source segments associated with a translation request.

FIG. 8 illustrates a database table 800 that can store information regarding segments to be translated. The database table 800 can include at least certain fields that correspond to fields 432 of the table 408 of FIG. 4.

In the table 800, it can be seen that values of an id field 808 are unique, uniquely identifying a source segment. Conversely, multiple records can have the same value for a project id field 812 or a filed id field 816. Values in a source value field 824 for a given key value in a source key field 820 can be used to provide text to be translated to a human translator or to a machine learning translator.

Example 8—Example User Interface Screens

FIGS. 9A-9I present a series of user interface screens that illustrate how disclosed technologies can be implemented to translate strings associated with a computer program, such as strings associated with various user interface elements.

Figure 9A:
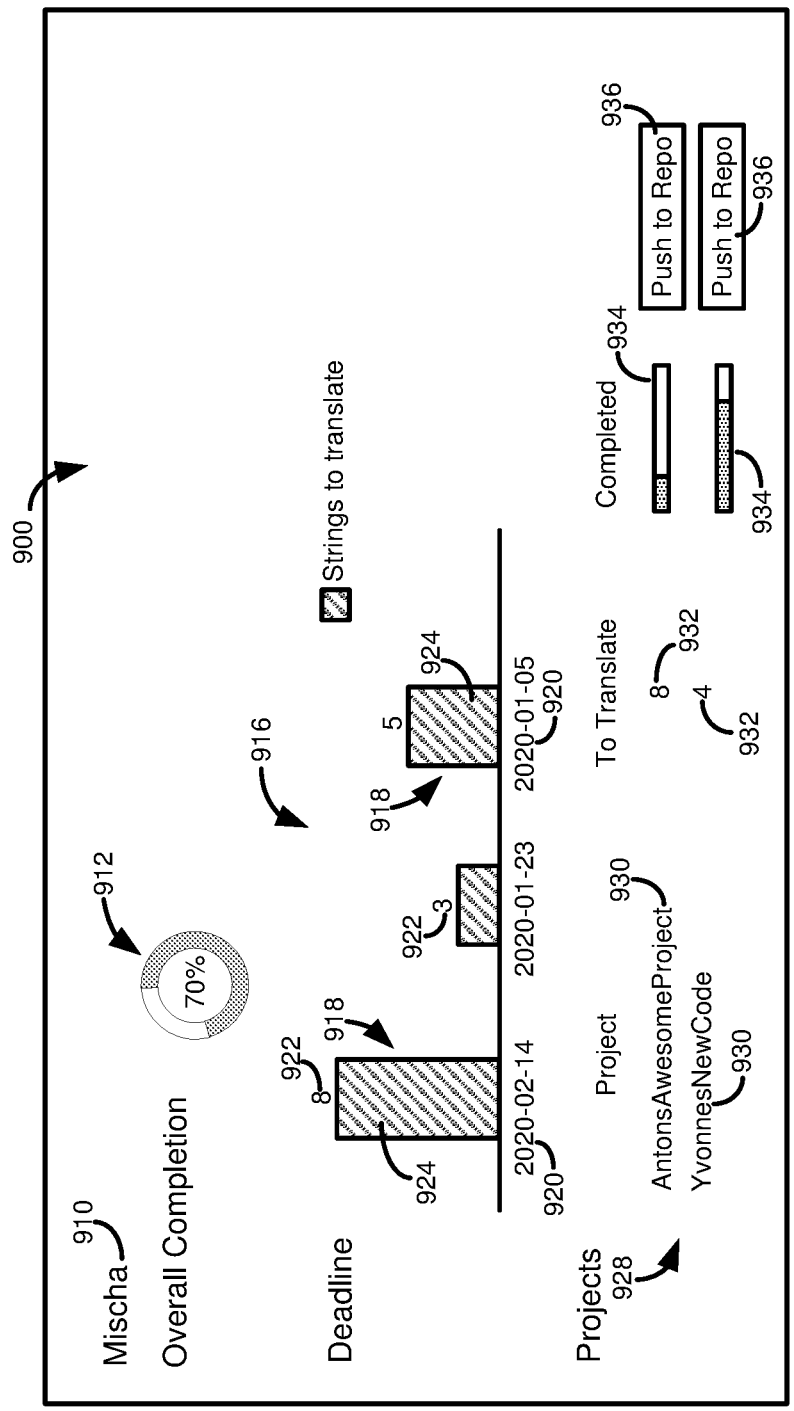

A screen 900 of FIG. 9A can represent a project status screen, such as a screen that might be presented on a translation interface to a human translator. The screen 900 generally describes outstanding translation projects, and allows a user to navigate to different projects and to take other actions, such as pushing translations to a source (e.g., a code repository associated with a translation submission).

The screen 900 can include the name of the translator 910 and can present a textual or visual element, or both, such as the screen element 912, that indicates an overall workload status for the translator. For example, the illustrated completion of 70% can indicate a percentage of strings or segments for active projects that have been translated, indicating that 30% of the strings in the projects remains to be translated.

A graph 916, or another visual element, can provide information regarding specific translation projects 918, such as a deadline 920 associated with a given project and a number of strings 922 remaining to be translated for the project. The size of a visual element 924 (e.g., column) for a particular project 918 can be used to indicate the relative amount of work remaining for the projects.

Additional details regarding translation projects can be provided in a list 928. The list 928 includes the names 930 of outstanding projects, a number of string 932 left to translate in the projects, and an indicator 934 of the completion of the particular project. For each project, a user interface control 936 (e.g., a button) can be provided to allow the translator to push translation results back to the source of a translation request.

Elements displayed on the screen 900 can be selectable, allowing a user to obtain more information regarding particular elements or to take particular action. For example, selecting a graph 916 or a project name 930 can take the translator to a page for the project where translations can be provided for the project. In some cases, selecting the number of strings 932 left to translate can cause the strings needing translation to be presented to the translator, which can help the translator complete a translation project.

Figure 9B:
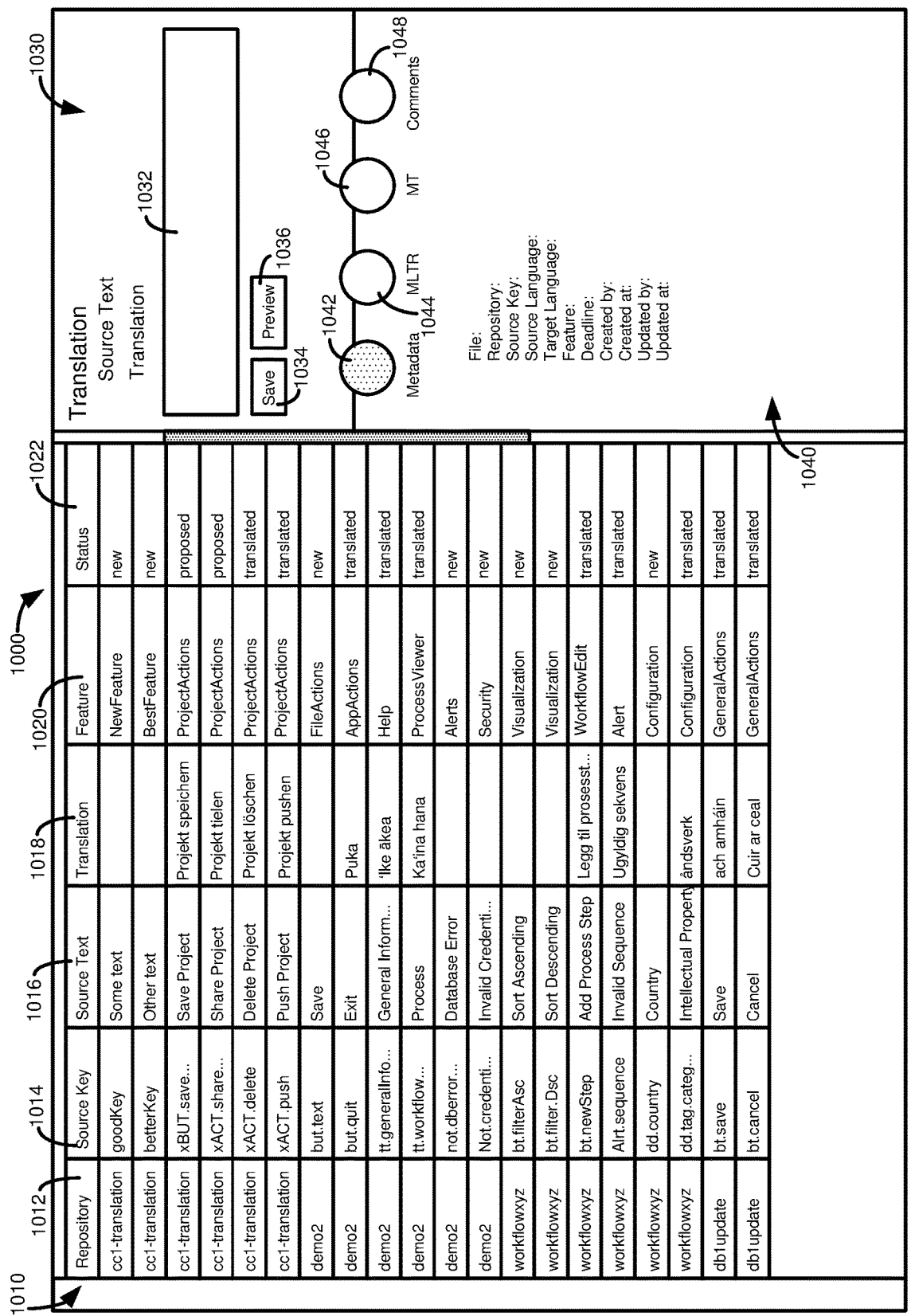

FIG. 9B illustrates a screen 1000 that a translator can use to view segments associated with a translation project, including segments in need of translation. The translator can also use the screen 1000 to enter or edit translations for segments.

The screen 1000 includes a table 1010 of segment information. In some cases, the table 1010 can represent a discrete table that is maintained in a database. In other cases, the table 1010 can be a view, including a materialized view, of query results that are obtained from retrieving (e.g., via a join operation) data from multiple tables, such as from the table 408 and the table 410 of FIG. 4.

The table 1010 includes a field 1012 identifying the repository that serves as the source of the segment. Fields 1014, 1016 store the source key (which can, for example, identify one or more user interface controls associated with text to be translated) and source text (i.e., source value) for a given segment. Once a translation has been provided for a record of the table 1010, the translation can be stored in a field 1018.

Additional metadata for a record can be stored in fields 1020, 1022. In particular, a feature field 1020 can provide details regarding the purpose of the key 1014, such as a general category associated with a user interface control corresponding to the key. A status associated with the segment can be stored in the field 1022, and can indicate, for example, a completion status of translation for the segment (e.g., new, proposed, translated). Among other things, the table 1010 can be sorted by one or more of the fields 1012-1022, which can be useful in helping a translator identify segments in need of translation or review. For example, a user can sort on field 1022 to view new segments that are in need of translation.

A window 1030 of the screen 1000 can allow a user to enter translations. For example, a user may select (e.g., using a pointing device) a record of the table 1010. A user can enter text for the translation in an entry field 1032. By selecting a save button 1034, the translation can be saved, such as to a database table that serves as a data source for the table 1010. A user can, in some implementations, preview a translation by selecting a preview button 1036. After the preview button 1036 is selected, the user interface (or a screenshot) that includes the relevant segment can be displayed to the translator, in some implementations. In other cases, selecting the preview button 1036 saves the translation to a data source for the table 1010, but the translation is indicated as tentative. For example, the preview may be performed by the developer once translation results are received from the translation service. If the developer approves, the developer may mark the translation as accepted or committed, in some cases. In other cases, the developer can indicate whether the translation is approved, and the translator can be responsible for final acceptance of the translation.

A window 1040 can include user interface elements 1042-1048 that can be selected by a user to obtain additional information or take additional actions. In particular, a metadata icon 1042 can be used to display metadata regarding a selected record of the table 1010. The metadata can include information from one or more data sources, such as the tables 404-410 of FIG. 4, that is not displayed in the table 1010.

A user interface element 1044 can be used to determine whether a translation repository includes translations that might be relevant for the selected record of table 1010. Similarly, a machine learning user interface element 1046 can be used to obtain a machine translation for a record of the table 1010, or to view a previously determined suggestion. Finally, a user interface element 1048 can be used to enter comments for a record of the table 1010.

FIG. 9C illustrates the screen 1000 after selection of a particular record of the table 1010, and selection of the translation repository user interface element 1044. It can be seen that the source text 1016 for the selected record is displayed in the window 1030, and a proposed translation has been entered by the translator in the entry field 1032.

The user interface element 1044 is shown as selected, and an indicator 1054 provides a number of suggestions identified in the translation repository. Actual suggestions 1056 are listed in the window 1040. In some cases, a translator can choose to accept one of the suggestions 1056 by selecting (e.g., "double clicking) a desired selection.

FIG. 9D illustrates the screen 1000 after a user has selected the machine translation user interface element 1046. One or more suggestions 1060 provided by the machine learning/machine translation service can be provided in the window 1040. A user may choose to accept a selection 1060, such as by selecting the selection or selecting an appropriate user interface control 1062.

Figure 9E:
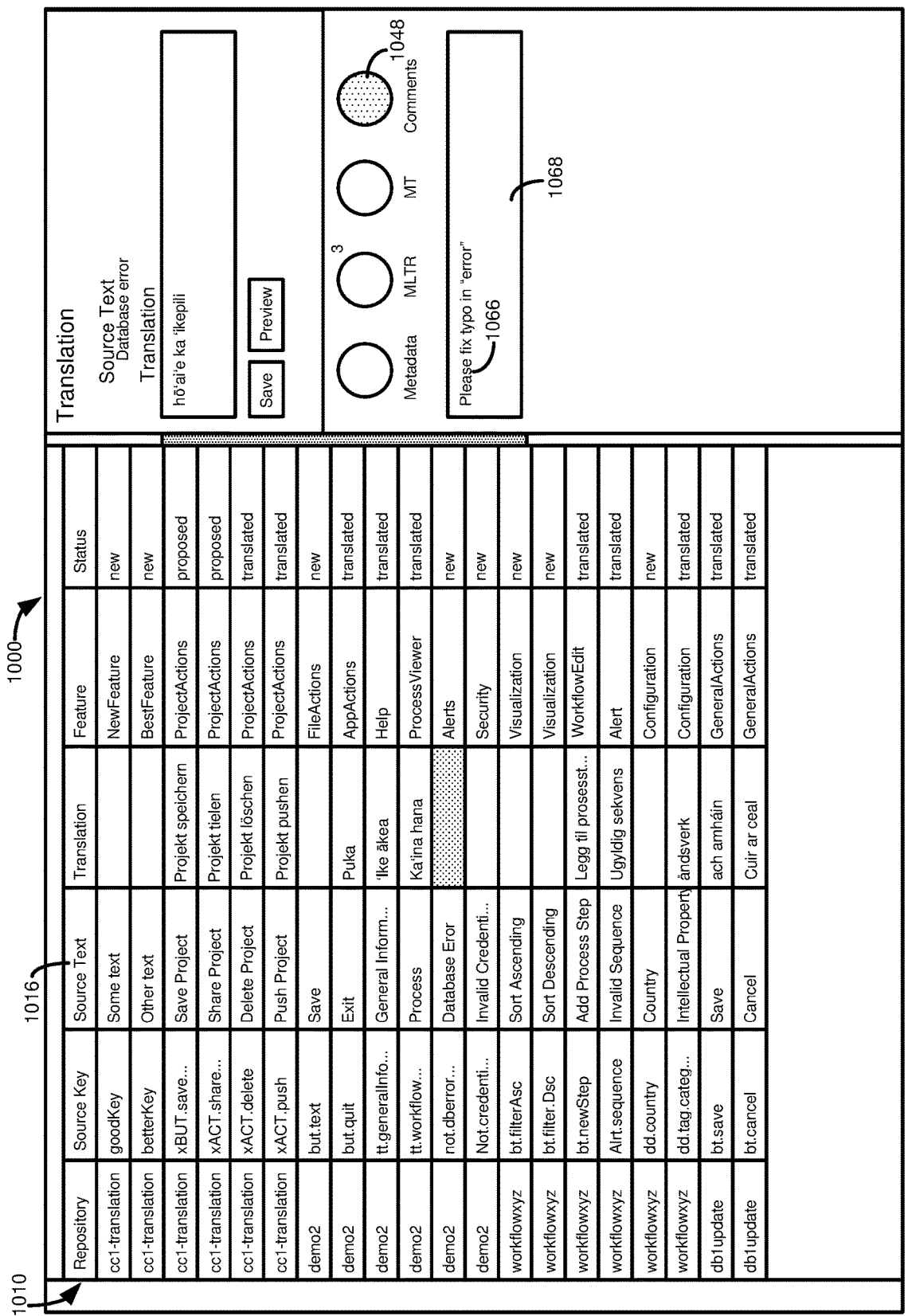

FIG. 9E illustrates the screen 1000 after a user has selected the comments user interface element 1048. The translator can enter comments 1066 in an entry field 1068. These comments 1066 can then be stored, such as in a table that serves as a data source for the table 1010. The comments can be returned in response to a translation submission, where they then can be viewed by a developer. As shown, the comments can be used, among other things, to provide questions or instructions to the developer, such as if the translator discovers a typographical error in the source text 1016, or if the source text itself is erroneous.

FIG. 9F illustrates a screen 1100 that can be presented to a user to define a translation project. The translation project can be a project that is referenced in the tables 404, 408, 410 of FIG. 4, and can be used to provide settings that can be used in translation submission associated with a translation project. The screen 1100 can provide an account name 1114 and a developer name 1116 associated with the project, where the account name 1114 can represent, for example, a particular entity, and the developer name 1116 can indicate a particular developer, group of developers, or multiple groups of developers (e.g., groups for different modules of a larger program) responsible for the project. In at least some cases, the account name 1114 and the developer name 1116 can be obtained automatically, such as from a source code repository, or from a translation request (which in turn can obtain the information from a source code repository).

A name for the project can be provided in a field 1118, while a file type (e.g., JSON file, Java properties file) can be provided in a field 1120.

A selector 1122 can be used to indicate whether non-ASCII characters should be escaped (i.e., removed) from source text to be translated. A domain (or subject field), which can be a general subject matter area for the project (e.g., human resources, manufacturing) can be entered in a field 1124. Source and target languages can be specified in fields 1126, 1128, respectively.

Selectors 1130, 1132, 1134 can be provided to allow a user to configure additional settings for a project. In particular, a selector 1130 can be set to indicate whether post-editing is required (e.g., whether the translations may need to be further edited before use, including when pretranslation is used and a human translator is to review and edit, if necessary, suggestions provided by machine translation or a translation repository). For example, selector 1130 can be set such that machine or dictionary translations are automatically provided as translation results, without requiring manual review/confirmation. Or, the selector 1130 can be set such that such automatic translations much be approved by a human translator before being provided as translation results.

Selector 1132 can be used to indicate whether review of the translation is required, including review of a translation provided by a human translator. For example, a second translator or a subject matter expert can review a first translator's work. Selector 1134 can be used to indicate whether a translation repository should be consulted during the translation, such as to provide pretranslation or suggestions for a human translator.

Figure 9G:
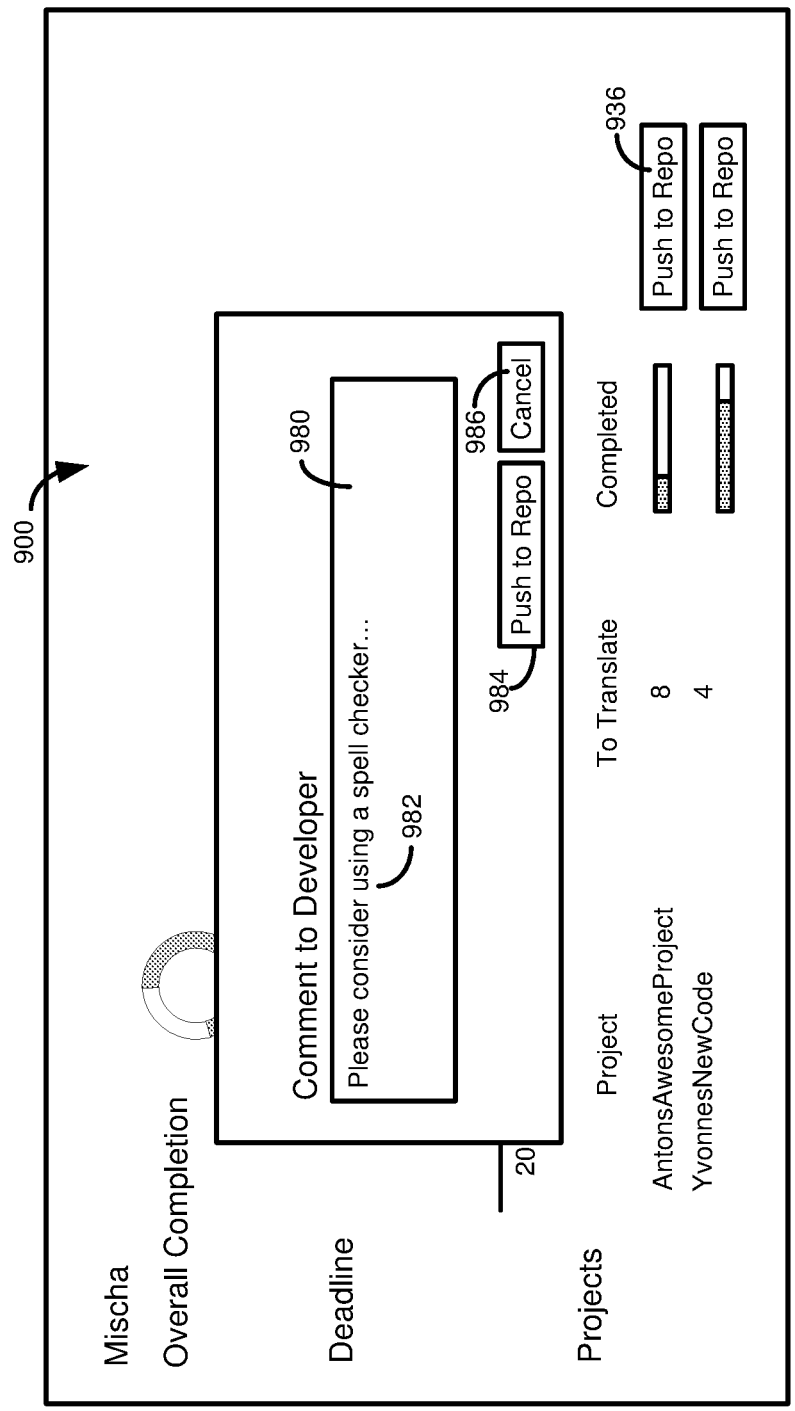

FIG. 9G illustrates the screen 900 after a translator has at least partially completed a translation and is returning translation results in response to a translation submission. The screen 900 of FIG. 9G can be displayed, for example, after a control 936 is selected. The screen 900 can provide a window 980, where a user can optionally enter comments 982 to a developer, where the comments are typically associated with the project overall, or a particular translation submission/request, rather than individual segments. Once any comments 982 have been entered, the results can be pushed back to the requestor by selecting control 984, or the push action can be cancelled by selecting control 986.

Figure 9H:
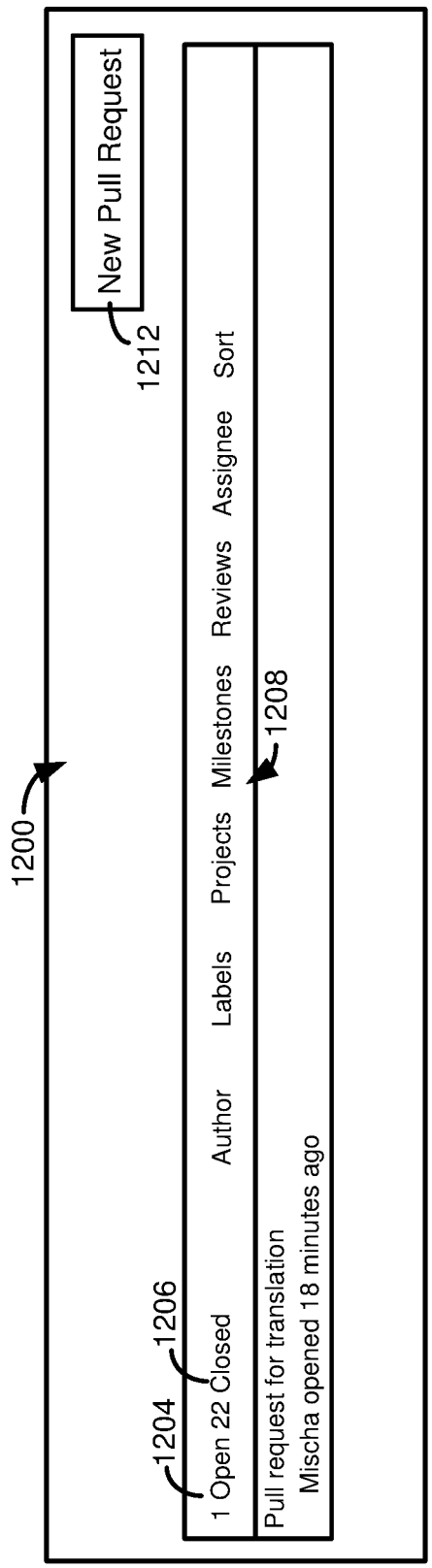

FIG. 9H illustrates a screen 1200 that be presented to a developer, and can summarize translation requests for one or more repositories. The screen 1200 can provide information regarding a number of open or outstanding project 1204 and a number of closed projects 1206. For a given project, various metadata 1208 can be displayed. If new translation results are available, a pull request icon 1212 can be highlighted, and results obtained by selecting the icon.

Figure 9I:
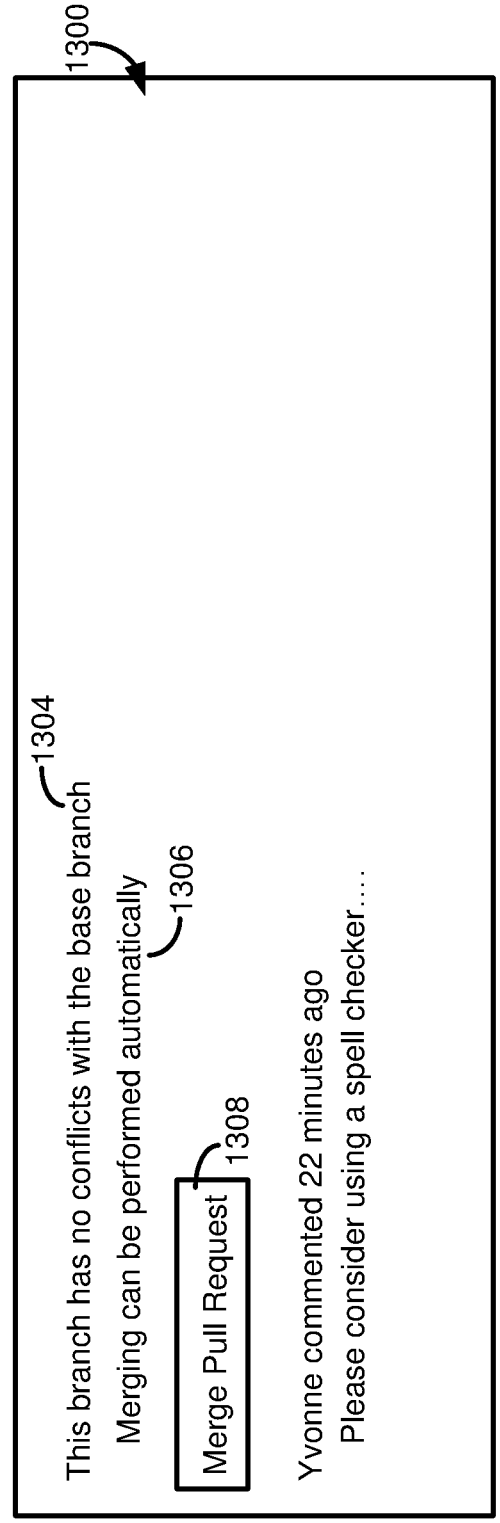

If translation results are available, details for the translation results can be provided in a screen 1300 of FIG. 9I. The screen 1300 can include information 1304 regarding whether conflicts were detected between the translation results and the code in a base branch, and information 1306 regarding whether changes associated with the translation results can be automatically merged with the repository. If the translation results can be merged with contents (e.g., files) of a code repository, a merge icon 1308 can be highlighted, and the merge executed if the merge icon is selected.

Figure 9J:
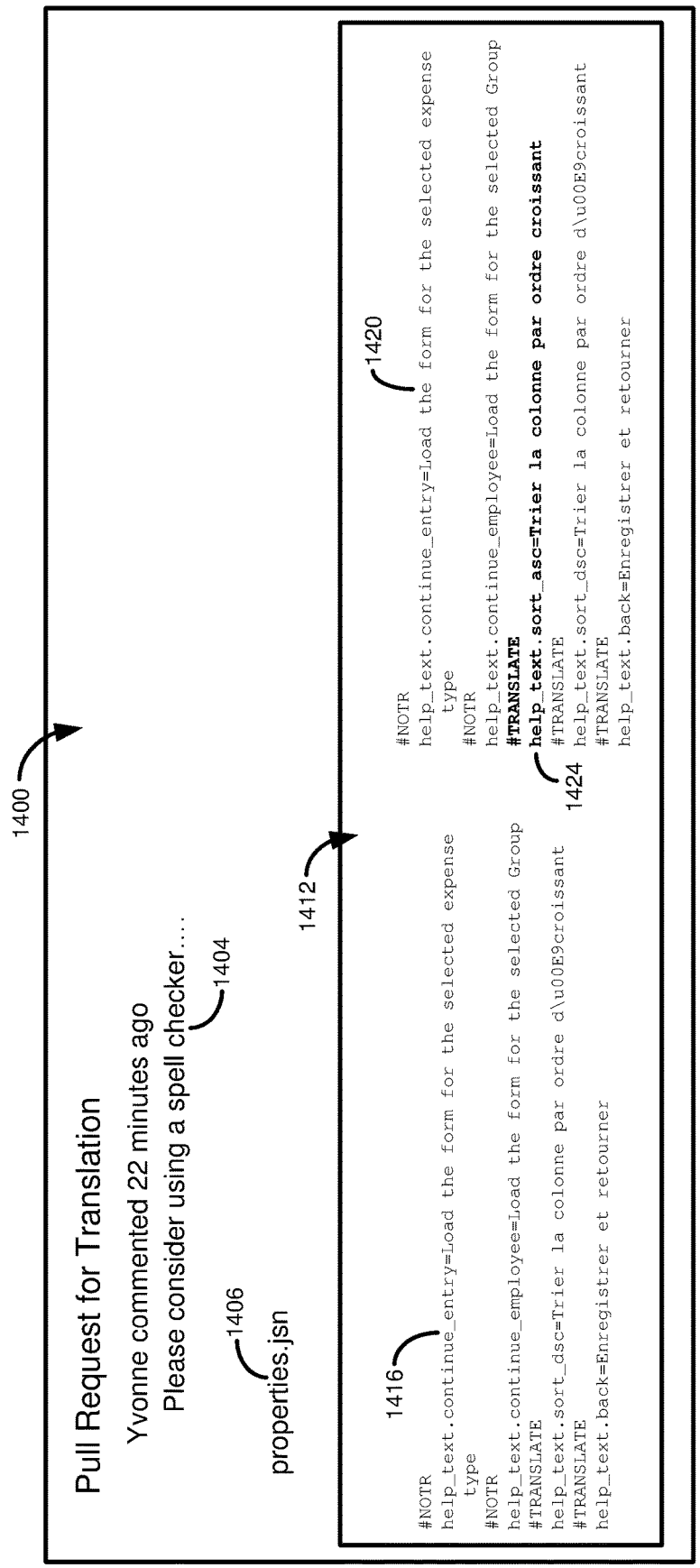

Once a merge request has been sent, the merge can be carried out, and a user can be presented with a summary of merge results, as shown in the screen 1400 of FIG. 9J. The screen 1400 can include any comments 1404 provided by the translator, and a file name 1406 associated with translation results being displayed. The translation results can include a window 1412 that shows text from a source file 1416 and text from a target file 1420. In some cases, the source file 1416 can be an original version of a file and the target file can 1420 can be a modified version of the file, and changes between the source and target files can optionally be highlighted in the window 1412.

In other cases, the source file 1416 can represent segments in a source language, and the target file 1420 can represent segments in the target language. If new strings, such as string 1424, have been added to the target file 1420, such strings can be highlighted in order to assist the developer in identifying newly translated strings.

Figure 9K:
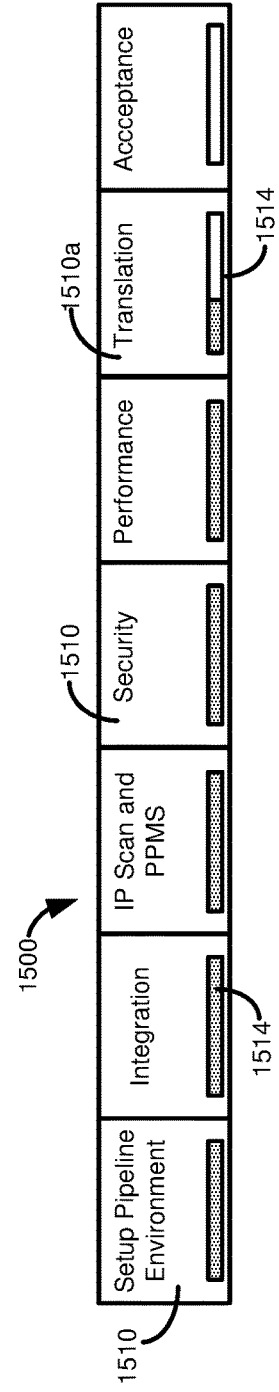

As has been discussed, such as in Examples 3 and 4, in some cases, translations can be integrated into code repository/version control management software. FIG. 9K illustrates a visual element 1500 that can be displayed as part of a code review process, such as a code review process that is triggered by a commit of code to the repository. A variety of checks or processing steps 1510 can be carried out, including a translation step 1510a. Each processing step 1510 can be associated with a status bar 1514 that indicates a completion state for the respective step. Optionally, a time for completing each processing step 1510 can be calculated and displayed.

Example 9—Example Translation Processing Operations

Figures 10A, 10B:
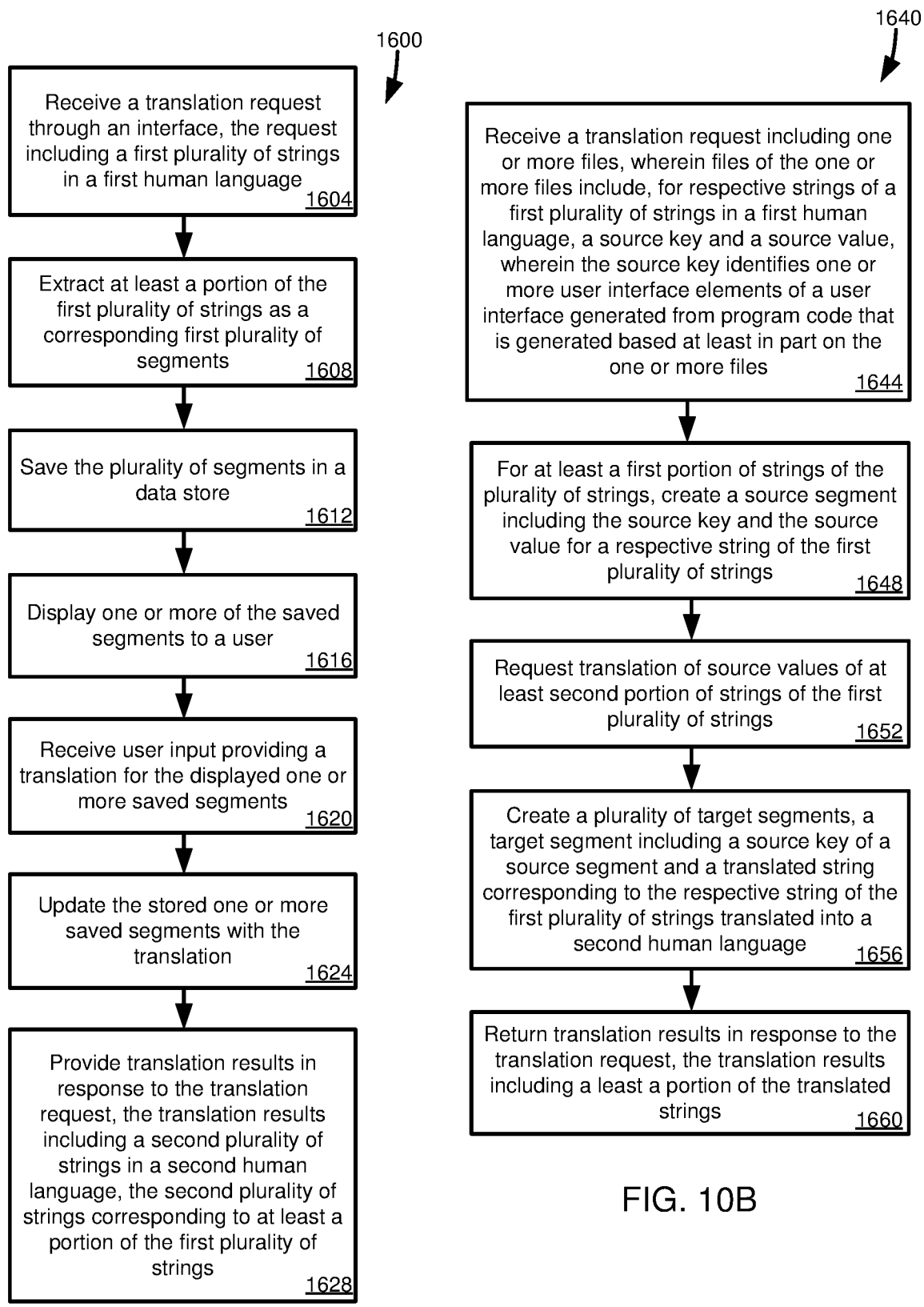
FIGS. 10A and 10B are flowcharts illustrating example methods for conducting a translation using a translation service.

FIG. 10A is a flowchart of an example method 1600 of processing a translation request. The method 1600 can be carried out using the architecture 200 of FIG. 2 or the architecture 300 of FIG. 3, and can use technologies disclosed in any of Examples 1-8.

At 1604, a translation request is received through an interface, such as an application program interface (API). The translation request includes a first plurality of strings in a first human language. At least a portion of the first plurality of strings are extracted at 1608 as a corresponding plurality of segments. At 1612, the plurality of segments are stored in a data store.

One or more of the saved segments are displayed to a user at 1616. At 1620, user input is received from the user providing a translation for the displayed one or more saved segments. The stored one or more saved segments are updated with the translation at 1624. At 1628, translation results are provided in response to the translation request. The translation results include a second plurality of strings in a second human language. The second plurality of strings corresponds to the at least a portion of the first plurality of strings.

FIG. 10B is a flowchart of another example method 1640 of processing a translation request. The method 1640 can be carried out using the architecture 200 of FIG. 2 or the architecture 300 of FIG. 3, and can use technologies disclosed in any of Examples 1-8.

A translation request that includes one or more files is received at 1644. Files of the one or more files include, for respective strings of a first plurality of strings in a first human language, a source key and a source value that includes one or more strings of the first plurality of strings. The source key identifies one or more user interface elements of a user interface generated from program code that is generated based at least in part on the one or more files.

At 1648, for at least a first portion of strings of the first plurality of strings, a source segment is created. A given source segment includes the source key and the source value for a respective string of the first plurality of strings. A translation of source values of at least a second portion of strings of the first plurality of strings is requested at 1652. At 1656, a plurality of target segments are created. A given target segment includes a source key of a source segment and a translated string corresponding to the respective string of the first plurality of strings translated into a second human language. Translation results are returned at 1660 in response to the translation request. The translation results include at least a portion of the translated strings.

Figure 10C:
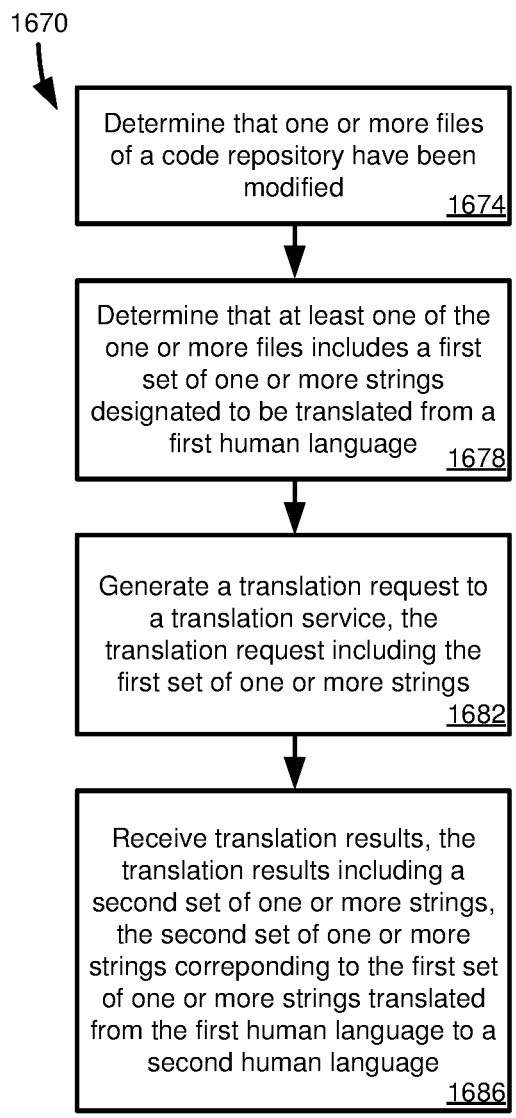
FIG. 10C is a flowchart of an example method for sending a translation request to a translation service and receiving translation results.

FIG. 10C is a flowchart of a method 1670 for automatically translating strings associated with files in a code repository. The method 1670 can be carried out using the architecture 200 of FIG. 2 or the architecture 300 of FIG. 3, and can use technologies disclosed in any of Examples 1-8.

At 1674, it is determined that one or more files of a code repository have been modified. It is determined at 1678 that at least one of the one or more files includes a first set of one or more strings designated to be translated from a first human language. At 1682, a translation request to a translation service is generated. The translation request includes the first set of one or more strings. Translation results are received at 1686. The translation results include a second set of one or more strings. The second set of one or more strings corresponds to the first set of one or more strings translated from the first human language to a second human language.

Example 10—Computing Systems

FIG. 11 depicts a generalized example of a suitable computing system 1700 in which the described innovations may be implemented. The computing system 1700 is not intended to suggest any limitation as to scope of use or functionality of the present disclosure, as the innovations may be implemented in diverse general-purpose or special-purpose computing systems.

With reference to FIG. 11, the computing system 1700 includes one or more processing units 1710, 1715 and memory 1720, 1725. In FIG. 11, this basic configuration 1730 is included within a dashed line. The processing units 1710, 1715 execute computer-executable instructions, such as for implementing technologies described in Examples 1-9. A processing unit can be a general-purpose central processing unit (CPU), processor in an application-specific integrated circuit (ASIC), or any other type of processor. In a multi-processing system, multiple processing units execute computer-executable instructions to increase processing power. For example, FIG. 11 shows a central processing unit 1710 as well as a graphics processing unit or co-processing unit 1715. The tangible memory 1720, 1725 may be volatile memory (e.g., registers, cache, RAM), non-volatile memory (e.g., ROM, EEPROM, flash memory, etc.), or some combination of the two, accessible by the processing unit(s) 1710, 1715. The memory 1720, 1725 stores software 1780 implementing one or more innovations described herein, in the form of computer-executable instructions suitable for execution by the processing unit(s) 1710, 1715.

A computing system 1700 may have additional features. For example, the computing system 1700 includes storage 1740, one or more input devices 1750, one or more output devices 1760, and one or more communication connections 1770. An interconnection mechanism (not shown) such as a bus, controller, or network interconnects the components of the computing system 1700. Typically, operating system software (not shown) provides an operating environment for other software executing in the computing system 1700, and coordinates activities of the components of the computing system 1700.

The tangible storage 1740 may be removable or non-removable, and includes magnetic disks, magnetic tapes or cassettes, CD-ROMs, DVDs, or any other medium which can be used to store information in a non-transitory way, and which can be accessed within the computing system 1700. The storage 1740 stores instructions for the software 1780 implementing one or more innovations described herein.

The input device(s) 1750 may be a touch input device such as a keyboard, mouse, pen, or trackball, a voice input device, a scanning device, or another device that provides input to the computing system 1700. The output device(s) 1760 may be a display, printer, speaker, CD-writer, or another device that provides output from the computing system 1700.

The communication connection(s) 1770 enable communication over a communication medium to another computing entity. The communication medium conveys information such as computer-executable instructions, audio or video input or output, or other data in a modulated data signal. A modulated data signal is a signal that has one or more of its characteristics set or changed in such a manner as to encode information in the signal. By way of example, and not limitation, communication media can use an electrical, optical, RF, or other carrier.

The innovations can be described in the general context of computer-executable instructions, such as those included in program modules, being executed in a computing system on a target real or virtual processor. Generally, program modules or components include routines, programs, libraries, objects, classes, components, data structures, etc. that perform particular tasks or implement particular abstract data types. The functionality of the program modules may be combined or split between program modules as desired in various embodiments. Computer-executable instructions for program modules may be executed within a local or distributed computing system.

The terms "system" and "device" are used interchangeably herein. Unless the context clearly indicates otherwise, neither term implies any limitation on a type of computing system or computing device. In general, a computing system or computing device can be local or distributed, and can include any combination of special-purpose hardware and/or general-purpose hardware with software implementing the functionality described herein.

In various examples described herein, a module (e.g., component or engine) can be "coded" to perform certain operations or provide certain functionality, indicating that computer-executable instructions for the module can be executed to perform such operations, cause such operations to be performed, or to otherwise provide such functionality. Although functionality described with respect to a software component, module, or engine can be carried out as a discrete software unit (e.g., program, function, class method), it need not be implemented as a discrete unit. That is, the functionality can be incorporated into a larger or more general-purpose program, such as one or more lines of code in a larger or general-purpose program.

For the sake of presentation, the detailed description uses terms like "determine" and "use" to describe computer operations in a computing system. These terms are high-level abstractions for operations performed by a computer, and should not be confused with acts performed by a human being. The actual computer operations corresponding to these terms vary depending on implementation.

Example 11—Cloud Computing Environment

Figure 12:
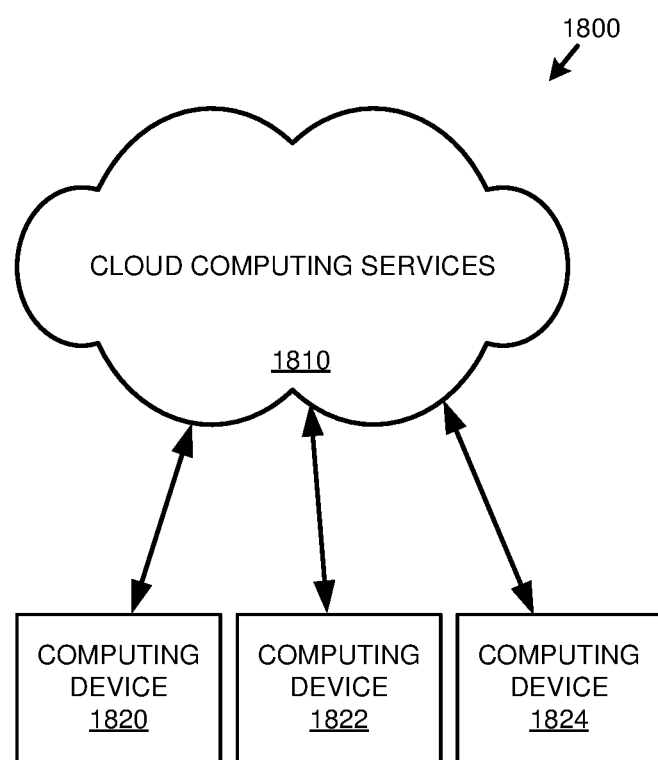
FIG. 12 is an example cloud computing environment that can be used in conjunction with the technologies described herein.

FIG. 12 depicts an example cloud computing environment 1800 in which the described technologies can be implemented. The cloud computing environment 1800 comprises cloud computing services 1810. The cloud computing services 1810 can comprise various types of cloud computing resources, such as computer servers, data storage repositories, networking resources, etc. The cloud computing services 1810 can be centrally located (e.g., provided by a data center of a business or organization) or distributed (e.g., provided by various computing resources located at different locations, such as different data centers and/or located in different cities or countries).

The cloud computing services 1810 are utilized by various types of computing devices (e.g., client computing devices), such as computing devices 1820, 1822, and 1824. For example, the computing devices (e.g., 1820, 1822, and 1824) can be computers (e.g., desktop or laptop computers), mobile devices (e.g., tablet computers or smart phones), or other types of computing devices. For example, the computing devices (e.g., 1820, 1822, and 1824) can utilize the cloud computing services 1810 to perform computing operators (e.g., data processing, data storage, and the like).

Example 12—Implementations

Although the operations of some of the disclosed methods are described in a particular, sequential order for convenient presentation, it should be understood that this manner of description encompasses rearrangement, unless a particular ordering is required by specific language set forth below. For example, operations described sequentially may in some cases be rearranged or performed concurrently. Moreover, for the sake of simplicity, the attached figures may not show the various ways in which the disclosed methods can be used in conjunction with other methods.

Any of the disclosed methods can be implemented as computer-executable instructions or a computer program product stored on one or more computer-readable storage media, such as tangible, non-transitory computer-readable storage media, and executed on a computing device (e.g., any available computing device, including smart phones or other mobile devices that include computing hardware). Tangible computer-readable storage media are any available tangible media that can be accessed within a computing environment (e.g., one or more optical media discs such as DVD or CD, volatile memory components (such as DRAM or SRAM), or nonvolatile memory components (such as flash memory or hard drives)). By way of example, and with reference to FIG. 11, computer-readable storage media include memory 1720 and 1725, and storage 1740. The term computer-readable storage media does not include signals and carrier waves. In addition, the term computer-readable storage media does not include communication connections (e.g., 1770).

Any of the computer-executable instructions for implementing the disclosed techniques as well as any data created and used during implementation of the disclosed embodiments can be stored on one or more computer-readable storage media. The computer-executable instructions can be part of, for example, a dedicated software application or a software application that is accessed or downloaded via a web browser or other software application (such as a remote computing application). Such software can be executed, for example, on a single local computer (e.g., any suitable commercially available computer) or in a network environment (e.g., via the Internet, a wide-area network, a local-area network, a client-server network (such as a cloud computing network), or other such network) using one or more network computers.

For clarity, only certain selected aspects of the software-based implementations are described. Other details that are well known in the art are omitted. For example, it should be understood that the disclosed technology is not limited to any specific computer language or program. For instance, the disclosed technology can be implemented by software written in C, C++, C#, Java, Perl, JavaScript, Python, R, Ruby, ABAP, SQL, XCode, GO, Adobe Flash, or any other suitable programming language, or, in some examples, markup languages such as html or XML, or combinations of suitable programming languages and markup languages. Likewise, the disclosed technology is not limited to any particular computer or type of hardware. Certain details of suitable computers and hardware are well known and need not be set forth in detail in this disclosure.

Furthermore, any of the software-based embodiments (comprising, for example, computer-executable instructions for causing a computer to perform any of the disclosed methods) can be uploaded, downloaded, or remotely accessed through a suitable communication means. Such suitable communication means include, for example, the Internet, the World Wide Web, an intranet, software applications, cable (including fiber optic cable), magnetic communications, electromagnetic communications (including RF, microwave, and infrared communications), electronic communications, or other such communication means.

The disclosed methods, apparatus, and systems should not be construed as limiting in any way. Instead, the present disclosure is directed toward all novel and nonobvious features and aspects of the various disclosed embodiments, alone and in various combinations and sub combinations with one another. The disclosed methods, apparatus, and systems are not limited to any specific aspect or feature or combination thereof, nor do the disclosed embodiments require that any one or more specific advantages be present, or problems be solved.

The technologies from any example can be combined with the technologies described in any one or more of the other examples. In view of the many possible embodiments to which the principles of the disclosed technology may be applied, it should be recognized that the illustrated embodiments are examples of the disclosed technology and should not be taken as a limitation on the scope of the disclosed technology. Rather, the scope of the disclosed technology includes what is covered by the scope and spirit of the following claims.

What is claimed is:

1. A computing system comprising:
memory;
one or more processing units, each of the one or more processing units coupled to at least a portion of the memory; and
one or more computer readable storage media storing instructions that, when executed, cause the computing system to perform operations comprising:
receiving through an application programming interface (API) a translation request from a first software application for a first plurality of strings comprised in program code of a second software application or a software object being created or modified by a first user, the software object useable by a third software application, wherein the third software application is the second software application or is a software application different than the first software application, the first plurality of strings being a subset of a second plurality of strings comprised in the program code or the software object and being in a first human language;
after the receiving, extracting at least a portion of the second plurality of strings as a corresponding plurality of segments;
saving the plurality of segments in a data store;
after the saving the plurality of segments in a data store, displaying one or more saved segments of the saved plurality of segments to a second user, wherein when the translation request is from a first user and the second user is different than the first user;
after the displaying, receiving from the second user, user input providing or confirming a translation for the displayed one or more saved segments;
updating the one or more saved segments with the translation; and
after the updating, providing translation results to the first user or the first software application in response to the translation request, the translation results comprising a third plurality of strings in at least a second human language, the third plurality of strings corresponding to at least a portion of the second plurality of strings.

2. The computing system of claim 1, wherein strings of the second plurality of strings of the translation request are source text values that are associated with corresponding source keys, wherein a given source key is uniquely associated with a given source text value.

3. The computing system of claim 1, wherein a given source key identifies a user interface control of the second software application.

4. The computing system of claim 3, wherein program code defining the user interface control is not included in the one or more files.

5. The computing system of claim 3, wherein source key text for a corresponding source key is displayed in association with the user interface control during runtime of the second software application.

6. The computing system of claim 1, wherein strings of the second plurality of strings are associated with an identifier indicating whether a given string of the second plurality of strings is to be translated during processing of a translation request.

7. The computing system of claim 1, wherein the translation request is associated with one or more files of a code repository and the plurality of saved segments are stored in association with an identifier of the code repository and an identifier of a file of the one or more files.

8. The computing system of claim 1, wherein extracting at least a portion of the second plurality of strings comprises converting the translation request from a first format to an interchange format.

9. The computing system of claim 8, wherein the interchange format is the XLIFF format.

10. The computing system of claim 8, wherein providing translation results in response to the translation request comprises converting at least a portion of the updated one or more saved segments to the first format.

11. The computing system of claim 1, the operations further comprising:
automatically determining that a file of a code repository has been updated and committed; and
automatically generating the translation request in response to the automatically determining.

12. The computing system of claim 1, wherein the translation request is associated with a project, the project specifying the first human language and the at least a second human language.

13. The computing system of claim 1, the operations further comprising:
requesting machine translation results for at least a portion of the plurality of saved segments.

14. The computing system of claim 1, the operations further comprising:
querying a translation repository for at least a portion of strings of the second plurality of strings stored in respective segments of the plurality of segments.

15. The computing system of claim 1, wherein the translation request comprises one or more files, the one or more files comprising the second plurality of strings.

16. The computing system of claim 15, wherein the files of the one or more files further comprise, for respective strings of the second plurality of strings, an identifier of whether the respective string is to be translated into the second human language.

17. The computing system of claim 1, the operations further comprising:
after the receiving, creating a plurality of target segments, where a given target segment comprises a source key of a source segment and a translated string corresponding to the respective string of the second plurality of strings translated into a second human language.

18. The computing system of claim 1, the operations further comprising:
automatically determining that a file of a code repository has been modified; and
automatically generating the translation request in response to the automatically determining.

19. A method, implemented in a computing system comprising at least one hardware processor and at least one memory coupled to the at least one hardware processor, the method comprising:
receiving through an application programming interface (API) a translation request from a first software application for a first plurality of strings comprised in program code of a second software application or a software object being created or modified by a first user, the software object useable by a third software application, wherein the third software application is the second software application or is a software application different than the first software application, the first plurality of strings being a subset of a second plurality of strings comprised in the program code or the software object and being in a first human language;

after the receiving, extracting at least a portion of the second plurality of strings as a corresponding plurality of segments;

saving the plurality of segments in a data store;

after the saving the plurality of segments in a data store, displaying one or more saved segments of the saved plurality of segments to a second user, wherein when the translation request is from a first user and the second user is different than the first user;

after the displaying, receiving, from the second user, user input providing or confirming a translation for the displayed one or more saved segments;

updating the one or more saved segments with the translation; and after the updating, providing translation results to the first user or the first software application in response to the translation request, the translation results comprising a third plurality of strings in at least a second human language, the third plurality of strings corresponding to at least a portion of the second plurality of strings.

20. One or more non-transitory computer readable media comprising:

computer-executable instructions that, when executed by a computing system comprising at least one hardware processor and at least one memory coupled to the at least one hardware processor, cause the computing system to receive through an application programming interface (API) a translation request from a first software application for a first plurality of strings comprised in program code of a second software application or a software object being created or modified by a first user, the software object useable by a third software application, wherein the third software application is the second software application or is a software application different than the first software application, the first plurality of strings being a subset of a second plurality of strings comprised in the program code or the software object and being in a first human language;

computer-executable instructions that, when executed by the computing system, cause the computing system to, after the receiving, extract at least a portion of the second plurality of strings as a corresponding plurality of segments;

computer-executable instructions that, when executed by the computing system, cause the computing system to save the plurality of segments in a data store;

computer-executable instructions that, when executed by the computing system, cause the computing system to, after the saving the plurality of segments in a data store, display one or more saved segments of the saved plurality of segments to a second user, wherein when the translation request is from a first user and the second user is different than the first user;

computer-executable instructions that, when executed by the computing system, cause the computing system to, after the displaying, receive, from the second user, user input providing or confirming a translation for the displayed one or more saved segments;

computer-executable instructions that, when executed by the computing system, cause the computing system to update the one or more saved segments with the translation; and computer-executable instructions that, when executed by the computing system, cause the computing system to, after the updating, provide translation results to the first user or the first software application in response to the translation results to the first user or the first software application in response to the translation request, the translation results comprising a third plurality of strings in at least a second human language, the third plurality of strings corresponding to at least a portion of the second plurality of strings.

\* \* \* \* \*